(12) United States Patent
Hariyama et al.

(10) Patent No.: US 10,051,851 B2
(45) Date of Patent: Aug. 21, 2018

(54) ATTRACTION DEVICE, INSECT-CAPTURING APPARATUS AND INSECT-CAPTURING METHOD

(71) Applicant: HAMAMATSU UNIVERSITY SCHOOL OF MEDICINE, Shizuoka (JP)

(72) Inventors: Takahiko Hariyama, Shizuoka (JP); Mantaro Hironaka, Shizuoka (JP)

(73) Assignee: HAMAMATSU UNIVERSITY SCHOOL OF MEDICINE, Hamamatsu-shi, Shizuoka (JP)

( * ) Notice: Subject to any disclaimer, the term of this patent is extended or adjusted under 35 U.S.C. 154(b) by 514 days.

(21) Appl. No.: 14/345,703

(22) PCT Filed: Sep. 20, 2012

(86) PCT No.: PCT/JP2012/074100
§ 371 (c)(1),
(2) Date: Mar. 19, 2014

(87) PCT Pub. No.: WO2013/042743
PCT Pub. Date: Mar. 28, 2013

(65) Prior Publication Data
US 2014/0223803 A1 Aug. 14, 2014

(30) Foreign Application Priority Data

Sep. 20, 2011 (JP) .................. 2011-205132
Mar. 6, 2012 (JP) .................. 2012-049842

(51) Int. Cl.
*A01M 1/04* (2006.01)
*A01M 1/22* (2006.01)
(Continued)

(52) U.S. Cl.
CPC .............. *A01M 1/04* (2013.01); *A01M 1/106* (2013.01); *A01M 1/145* (2013.01); *A01M 1/223* (2013.01)

(58) Field of Classification Search
CPC .......... A01M 1/00; A01M 1/02; A01M 1/023; A01M 1/04; A01M 1/08; A01M 1/10;
(Continued)

(56) References Cited

U.S. PATENT DOCUMENTS 670,996 A * 4/1901 Morgan ......................... 43/113
3,336,694 A * 8/1967 O'Connell .............. A01M 1/08
43/113
(Continued)

FOREIGN PATENT DOCUMENTS

CN 201562662 U 8/2010
EP 0475665 A1 3/1992
(Continued)

OTHER PUBLICATIONS

Horvath et al.; Ecological traps for dragonflies in a cemetery: the attraction of *Sympetrum* species (Odonata: Libellulidae) by horizontally polarizing black gravestones; 2007; Blackwell Publishing Ltd; Freshwater Biology; 52: 1700-1709.*
(Continued)

*Primary Examiner* — Joshua D Huson
*Assistant Examiner* — Michael A. Fabula
(74) *Attorney, Agent, or Firm* — Enshan Hong; VLP Law Group LLP

(57) ABSTRACT

By plates (31, 32) having different colors, an edge is formed in the vertical direction along the boundary between the plates (31, 32). Further, as materials of the plates (31, 32), a material which primarily transmits ultraviolet light having a wavelength of about 370 nm and a material which primarily transmits green light having a wavelength of about (Continued)

520 nm are used. This constitution makes an attraction device (10) capable of attracting insect pests more efficiently as compared to a case where a light source such as a mercury lamp which emits a large amount of light having a wavelength of 300 to 600 nm or an LED which emits a large amount of light having a relatively short wavelength is used.

28 Claims, 37 Drawing Sheets

(51) Int. Cl.
*A01M 1/10* (2006.01)
*A01M 1/14* (2006.01)

(58) Field of Classification Search
CPC ...... A01M 1/103; A01M 1/106; A01M 1/145; A01M 1/22; A01M 1/223
USPC .......................................................... 43/113
See application file for complete search history.

(56) References Cited

U.S. PATENT DOCUMENTS

| | | | | |
|---|---|---|---|---|
| 3,348,332 A * | 10/1967 | O'Connell | A01M 1/04 43/113 |
| 4,959,923 A * | 10/1990 | Aiello | A01M 1/145 43/112 |
| 5,170,583 A * | 12/1992 | Coaker | A01M 1/02 43/107 |
| 5,365,690 A * | 11/1994 | Nelson | A01M 1/145 43/113 |
| 5,425,197 A * | 6/1995 | Smith | A01M 1/04 43/113 |
| 5,722,199 A * | 3/1998 | Demarest | A01M 1/145 43/113 |
| 6,108,966 A * | 8/2000 | Otomo | A01M 1/145 43/113 |
| 6,199,315 B1 * | 3/2001 | Suzue | A01M 1/04 43/113 |
| 6,289,629 B2 * | 9/2001 | Greening | A01M 1/04 43/113 |
| 6,397,515 B1 * | 6/2002 | Brown | A01M 1/023 43/113 |
| 6,493,986 B1 * | 12/2002 | Nelson | A01M 1/145 43/113 |
| 6,758,009 B1 * | 7/2004 | Warner | A01M 1/145 43/113 |
| 6,786,001 B1 * | 9/2004 | Piper | A01M 1/04 43/113 |
| 7,150,125 B1 * | 12/2006 | Mizell, III | A01M 1/04 43/107 |
| 8,572,890 B1 * | 11/2013 | Lark | A01M 1/04 43/113 |
| 9,015,988 B2 * | 4/2015 | Zhang | A01M 1/145 43/107 |
| 2001/0013194 A1 * | 8/2001 | Greening | A01M 1/04 43/113 |
| 2002/0032980 A1 * | 3/2002 | Nelson | A01M 1/145 43/113 |
| 2002/0078620 A1 | 6/2002 | Nelson et al. | |
| 2003/0079398 A1 * | 5/2003 | Holmes | A01M 1/145 43/113 |
| 2003/0089024 A1 * | 5/2003 | Nelson | A01M 1/145 43/113 |
| 2004/0148846 A1 * | 8/2004 | Moore | A01M 1/08 43/113 |
| 2005/0055870 A1 * | 3/2005 | Yelverton | A01M 1/04 43/113 |
| 2006/0016120 A1 * | 1/2006 | Masters | A01M 1/023 43/114 |
| 2006/0107583 A1 * | 5/2006 | Wu | A01M 1/04 43/113 |
| 2006/0218851 A1 * | 10/2006 | Weiss | A01M 1/023 43/113 |
| 2007/0039236 A1 * | 2/2007 | Geier | A01M 1/02 43/139 |
| 2008/0134568 A1 * | 6/2008 | Cowan | A01M 1/04 43/113 |
| 2009/0025275 A1 * | 1/2009 | Cohnstaedt | A01M 1/04 43/113 |
| 2009/0038207 A1 * | 2/2009 | Lin | A01M 1/04 43/112 |
| 2009/0288333 A1 * | 11/2009 | Johnston | A01M 1/145 43/113 |
| 2010/0071254 A1 * | 3/2010 | Calkins | A01M 1/145 43/107 |
| 2010/0088948 A1 * | 4/2010 | Yeh | A01M 1/145 43/113 |
| 2010/0236133 A1 * | 9/2010 | Frisch | A01M 1/145 43/113 |
| 2011/0005124 A1 * | 1/2011 | Gelette | A01M 1/04 43/113 |
| 2011/0163246 A1 * | 7/2011 | Ishiwata | A01G 7/045 250/492.1 |
| 2012/0174470 A1 * | 7/2012 | Studer | A01M 1/145 43/113 |
| 2012/0186136 A1 * | 7/2012 | Schneidmiller | A01M 29/34 43/107 |
| 2012/0186137 A1 * | 7/2012 | Schneidmiller | A01M 1/04 43/121 |
| 2012/0204475 A1 * | 8/2012 | Schneidmiller | A01M 1/106 43/113 |
| 2013/0025184 A1 * | 1/2013 | Crawley | A01M 1/02 43/114 |
| 2013/0312314 A1 * | 11/2013 | Greening | A01M 1/145 43/114 |
| 2013/0318854 A1 * | 12/2013 | Zhang | A01M 1/145 43/2 |
| 2015/0020437 A1 * | 1/2015 | Crawley | A01M 1/2016 43/113 |

FOREIGN PATENT DOCUMENTS

| JP | H04-248947 A | 9/1992 |
| JP | 2000-000049 A | 1/2000 |
| JP | 2000-004754 A | 1/2000 |
| JP | 2000-060404 A | 2/2000 |
| JP | 2007-000102 A | 1/2007 |
| JP | 2008-029206 A | 2/2008 |
| JP | 2008-118953 A | 5/2008 |
| JP | 2010-118294 A | 5/2010 |
| JP | 2011-142876 A | 7/2011 |
| WO | 2009/084900 A2 | 7/2009 |

OTHER PUBLICATIONS

Manor et al.; Light intensity mediated polarotaxis in Ponella karachiensis (Ponetellidae, Copepoda); Mar. 31, 2009; Elsevier; Vision Research; 49: 2371-2378.*

Kirkpatrick et al.; Effectiveness of Green and Ultraviolet Light in Attracting Stored-Product Insects to Traps; Dec. 15, 1970; Entomological Society of America; Journal of Economic Entomology; 63: 1853-1855.*

Kriska et al.; Glass buildings on river banks as "polarized light traps" for mass-swarming polarotactic caddis flies; Oct. 14, 2007; Springer-Verlag; Naturwissenschaften; 95: 461-467.*

Illuminated dance floor; Apr. 11, 2010 via archive.org; Wikipedia; <http://en.wikipedia.org/wiki/illuminated_dance_floor>.*

Naor; Lighting and UV radiation: where do LEDs fit in?; Sep. 12, 2012; Leapfrog Lighting; <http://www.leapfroglighting.com/lighting_and_uv_radiation>.*

Extended European Search Report dated Mar. 19, 2015 for the European related application No. EP12833508.

(56) References Cited

OTHER PUBLICATIONS

First Office Action dated Aug. 29, 2014 in connection with China related Patent Application No. 201280044597.9.

* cited by examiner

ATTRACTION DEVICE, INSECT-CAPTURING APPARATUS AND INSECT-CAPTURING METHOD

PRIORITY CLAIM

This is a U.S. national stage of application No. PCT/JP2012/074100, filed on Sep. 20, 2012. Priority is claimed on the following applications: Country: Japan, Application No.: 2011-205132, Filed: Sep. 20, 2011; Country: Japan, Application No.: 2012-049842, Filed: Mar. 6, 2012, the content of which is/are incorporated here by reference.

TECHNICAL FIELD

The present disclosure relates to an attraction device, an insect-capturing apparatus and an insect-capturing method. More particularly, the present disclosure relates to an attraction device which attracts insects, an insect-capturing apparatus comprising the attraction device of the present disclosure, and an insect-capturing method using the attraction device of the present disclosure.

BACKGROUND ART

The compound eyes of most insects have a receptor highly sensitive to light of about 350 nm in wavelength and a receptor highly sensitive to light of about 530 nm in wavelength. Therefore, insect pests represented by stink bugs and moths are likely to be attracted to light having a wavelength of 300 to 600 nm. Accordingly, in those trapping devices for attracting and capturing such insect pests, a mercury lamp having a broad spectral range or a blue fluorescent lamp emitting a large amount of light in the ultraviolet region is used as an empirically-effective light source (see, for example, Patent Literatures 1 and 2).

CITATION LIST

Patent Literature

Patent Literature 1: Unexamined Japanese Patent Application Kokai Publication No. 2007-102
Patent Literature 2: Unexamined Japanese Patent Application Kokai Publication No. 2000-49

SUMMARY OF INVENTION

Technical Problem

When insects are attracted to a light source, it is known that they fly to the light source taking a helical path. With regard to the insect behavior in this process, various hypotheses have been made. However, none of the hypotheses has yet to offer a complete explanation on the insect behavior.

The present disclosure was made in view of the above-described circumstance and an object of the present disclosure is to efficiently attract insects based on novel viewpoints on insect behavior.

Solution to Problem

In order to achieve the above-described object, an attraction device according to a first viewpoint of the present disclosure comprises attraction means which forms a contrast by a color of a first wavelength region and a color of a second wavelength region different from the first wavelength region.

The attraction means may comprise: a first member which transmits light of the first wavelength region; and a second member which transmits light of the second wavelength region and is arranged adjacent to the first member.

The first member may also transmit the light of the second wavelength region in addition to the light of the first wavelength region.

The first member may also transmit light of a third wavelength region different from the first and second wavelength regions in addition to the light of the first wavelength region.

The attraction means may comprise: a first member which reflects the light of the first wavelength region; and a second member which reflects the light of the second wavelength region and is arranged adjacent to the first member.

The first member may also reflect the light of the second wavelength region in addition to the light of the first wavelength region.

The first member may also reflect light of a third wavelength region different from the first and second wavelength regions in addition to the light of the first wavelength region.

The attraction means may comprise: a first member which emits the light of the first wavelength region; and a second member which emits the light of the second wavelength region and is arranged adjacent to the first member.

The attraction means may comprise: a first member which emits the light of the first wavelength region and the light of the second wavelength region; and a second member which emits the light of the second wavelength region and is arranged adjacent to the first member.

The attraction means may comprise: a first member which emits the light of the first wavelength region and light of a third wavelength region different from the first and second wavelength regions; and a second member which emits the light of the second wavelength region and is arranged adjacent to the first member.

The attraction device may also comprise a light source which irradiates the first and second members with light.

The attraction means may also comprise: first and second diffuser panels which diffuse incoming light; a light source which emits the light of the first wavelength region into the first diffuser panel; a light source which emits the light of the second wavelength region into the first diffuser panel; and a light source which emits the light of the second wavelength region into the second diffuser panel.

The attraction means may also comprise: first and second diffuser panels which diffuse incoming light; a light source which emits the light of the first wavelength region into the first diffuser panel; a light source which emits the light of the second wavelength region into the second diffuser panel; and a light source which emits light of a third wavelength region different from the first and second wavelength regions into the first diffuser panel.

The first wavelength region may be the ultraviolet region.
The second wavelength region may be the green region.
An attraction device according to a second viewpoint of the present disclosure comprises attraction means which forms a contrast by a first polarized light and a second polarized light whose polarization direction is different from that of the first polarized light.

The attraction means may comprise: a first polarizing plate which transmits light oscillating in a first direction; and a second polarizing plate which transmits light oscillating in a second direction different from the first direction and is arranged adjacent to the first polarizing plate.

The attraction device may also comprise a light source which irradiates the first and second polarizing plates with light.

An insect-capturing apparatus according to a third viewpoint of the present disclosure comprises: the attraction device of the present disclosure; and insect-capturing means which captures an insect attracted by the attraction device.

The contrast may be arranged in the center of the insect-capturing means.

An insect-capturing method according to a fourth viewpoint of the present disclosure comprises the steps of: attracting an insect using the attraction device of the present disclosure; and capturing the thus attracted insect.

Advantageous Effects of Invention

Insects can be efficiently attracted at an attraction rate higher than the rate at which insects are attracted by light having a broad spectral range or by monochromatic light.

DESCRIPTION OF EMBODIMENTS

First Embodiment

Figure 1:
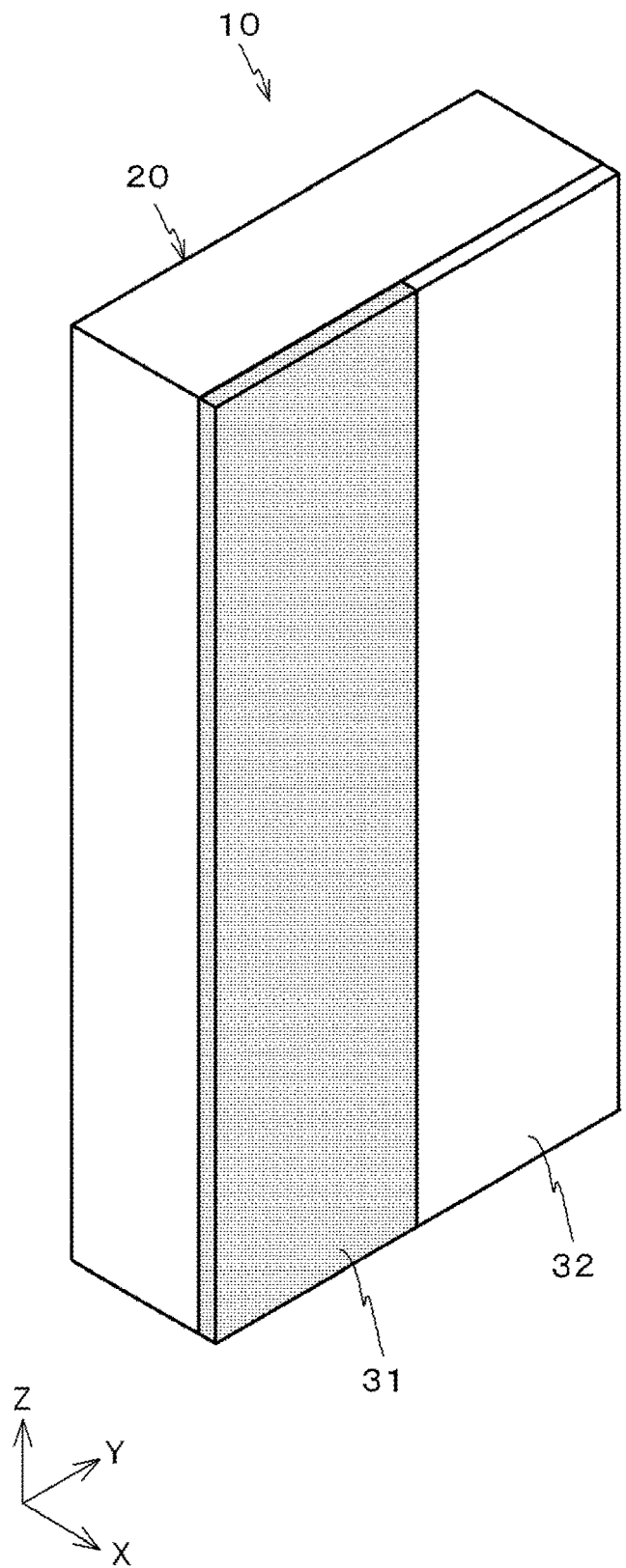
FIG. 1 is a perspective view showing the attraction device according to the first embodiment.

The first embodiment of the present disclosure will now be described referring to the drawings. In the following descriptions, for the sake of convenience, an XYZ coordinate system of three axes that are perpendicular to each other is used. In this coordinate system, the Z-axis is parallel to the vertical line.

FIG. 1 is a perspective view of an attraction device 10 according to this embodiment. The attraction device 10 is a device for attracting insect pests. As shown in FIG. 1, the attraction device 10 comprises a rectangular chassis 20 and rectangular plates 31 and 32 which are attached to the chassis 20.

Figure 2:
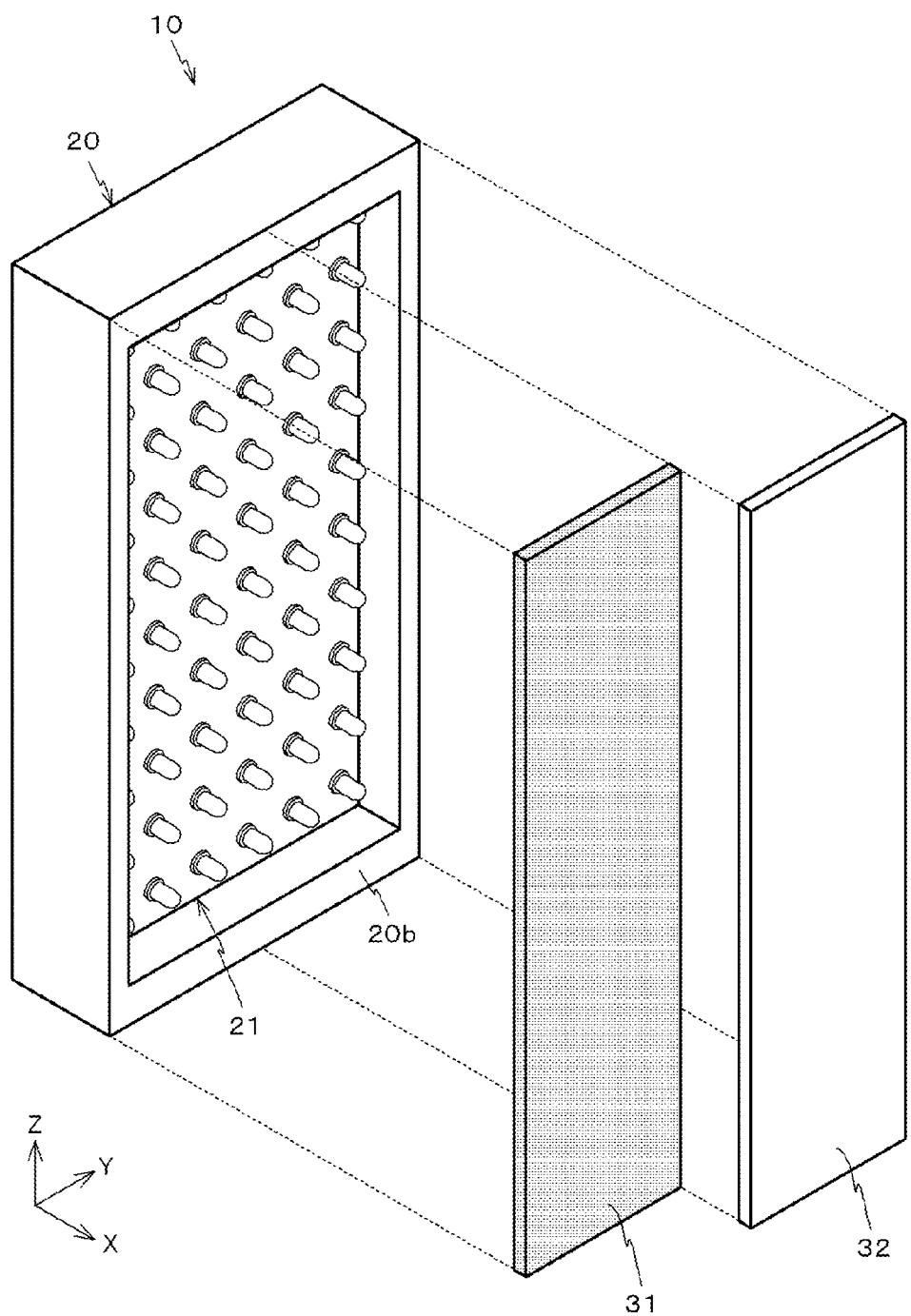
FIG. 2 is an expanded perspective view of the attraction device.

FIG. 2 is an expanded perspective view of the attraction device 10. As shown in FIG. 2, the chassis 20 is a casing which is open to the +X side. Inside the chassis 20, an LED unit 21 for illuminating the plates 31 and 32 is housed.

Figure 3:
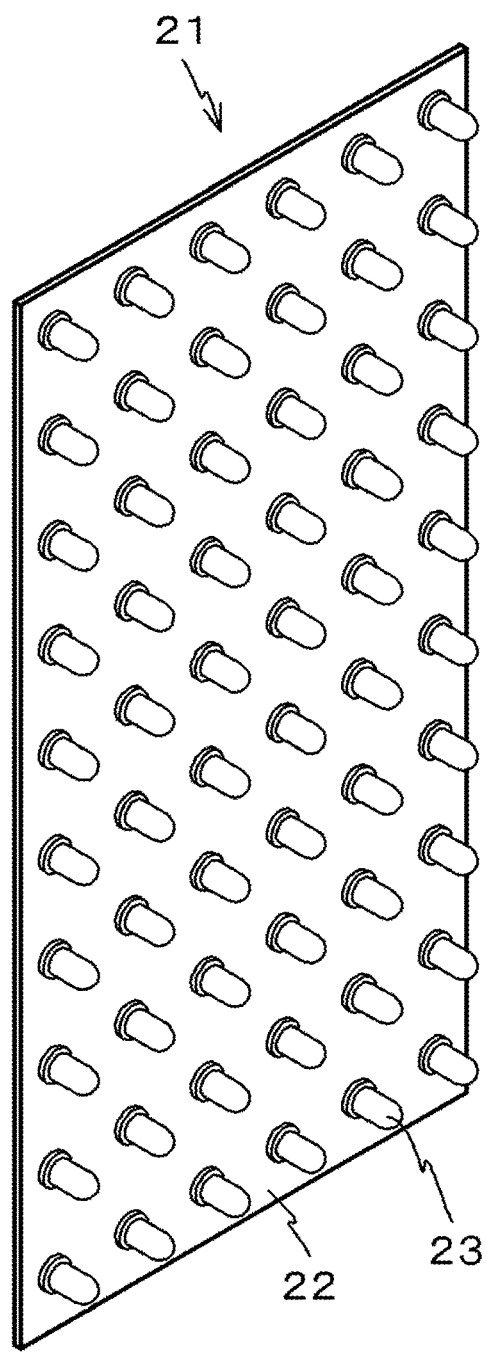
FIG. 3 is a perspective view showing an LED unit.

FIG. 3 is a perspective view showing the LED unit 21. As shown in FIG. 3, the LED unit 21 comprises a printed wiring board 22 and plural (60) LED (Light Emitting Diode) 23s that are mounted on the printed wiring board 22.

The printed wiring board 22 is a so-called glass epoxy board formed by impregnating glass fibers with a resin. The printed wiring board 22 is molded in a rectangular shape with the Z-axis direction being the longitudinal direction. On this printed wiring board 22, in addition to the LED 23s, an electronic component which constitutes the circuit for illuminating the LED 23s is also mounted.

The LED 23s are light-emitting elements that emit white light in the +X direction and they are mounted on the +X side of the printed wiring board 22. In this embodiment, the LED 23s are arrayed in the form of a matrix having 10 rows and 6 columns, with the Y-axis direction being the row direction and the Z-axis direction being the column direction.

Figure 4:
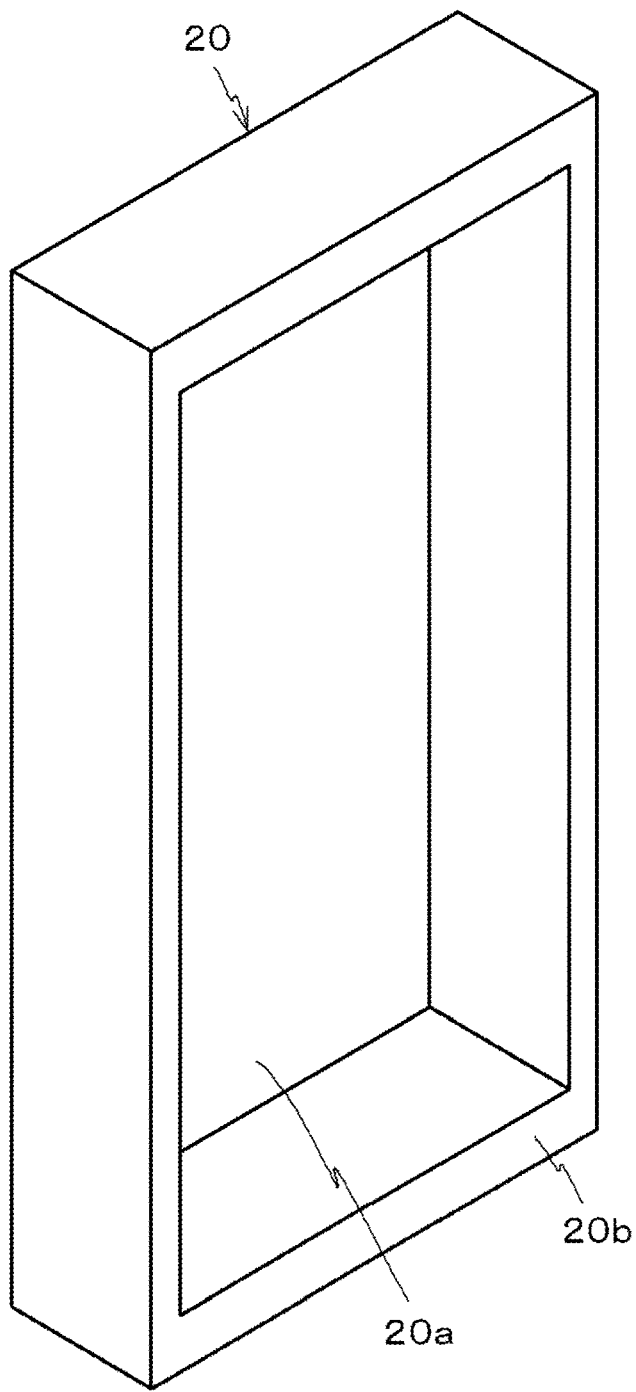
FIG. 4 is a perspective view of a chassis.

FIG. 4 is a perspective view of the chassis 20. The chassis 20 is a casing formed by, for example, injection molding of a resin. As shown in FIG. 4, the chassis 20 comprises two parts: a base plate 20a and a rectangular frame 20b formed along the periphery of the base plate 20a.

As shown in FIG. 2, the above-described LED unit 21 is housed in the inner space of the chassis 20. In this condition, the printed wiring board 22 is substantially parallel to the base plate 20a of the chassis 20.

The plate 31 is a rectangular plate-form member made of, for example, a semi-transparent resin, whose longitudinal direction is the Z-axis direction. This plate 31 primarily transmits, for example, light having a wavelength of about 370 nm. Therefore, the light transmitting through the plate 31 contains a relatively large amount of ultraviolet light having a wavelength of about 370 nm.

The plate 32 is a rectangular plate-form member made of, for example, a semi-transparent resin, whose longitudinal direction is the Z-axis direction. This plate 32 primarily transmits, for example, light having a wavelength of about 520 nm. Therefore, the light transmitting through the plate 32 contains a relatively large amount of green light having a wavelength of about 520 nm.

The above-described plates 31 and 32 of different colors have their sides covered with a sheet having a property of blocking illumination light, a paint or the like. Further, as shown in FIG. 1, the plates 31 and 32 are each fixed onto the frame 20b constituting the chassis 20 in a manner that they are adjacent to each other in the Y-axis direction.

The attraction device 10 constituted in the above-described manner is connected to, for example, a commercial power source via a power source cable not shown in the figure. Then, when the LED 23s constituting the LED unit 21 are illuminated by electric power supplied from the commercial power source, violet light having a wavelength of about 370 nm is emitted through the plate 31 and green light having a wavelength of about 520 nm is emitted through the plate 32. Consequently, an edge appears in the vertical direction on the boundary between the plates 31 and 32 due to a contrast formed by the light emitted through the plate 31 and the light emitted through the plate 32.

As described above, in the attraction device 10 according to this embodiment, an edge is formed in the vertical direction on the boundary between the plates 31 and 32 by the lights transmitting through the plates 31 and 32. Therefore, as compared to a case where a light source which emits a relatively large amount of light having a wavelength of 300 to 600 nm, such as a mercury lamp, is used, the attraction device 10 can attract insect pests more efficiently. The effects of using the attraction device 10 according to this embodiment will now be described below.

Figure 5:
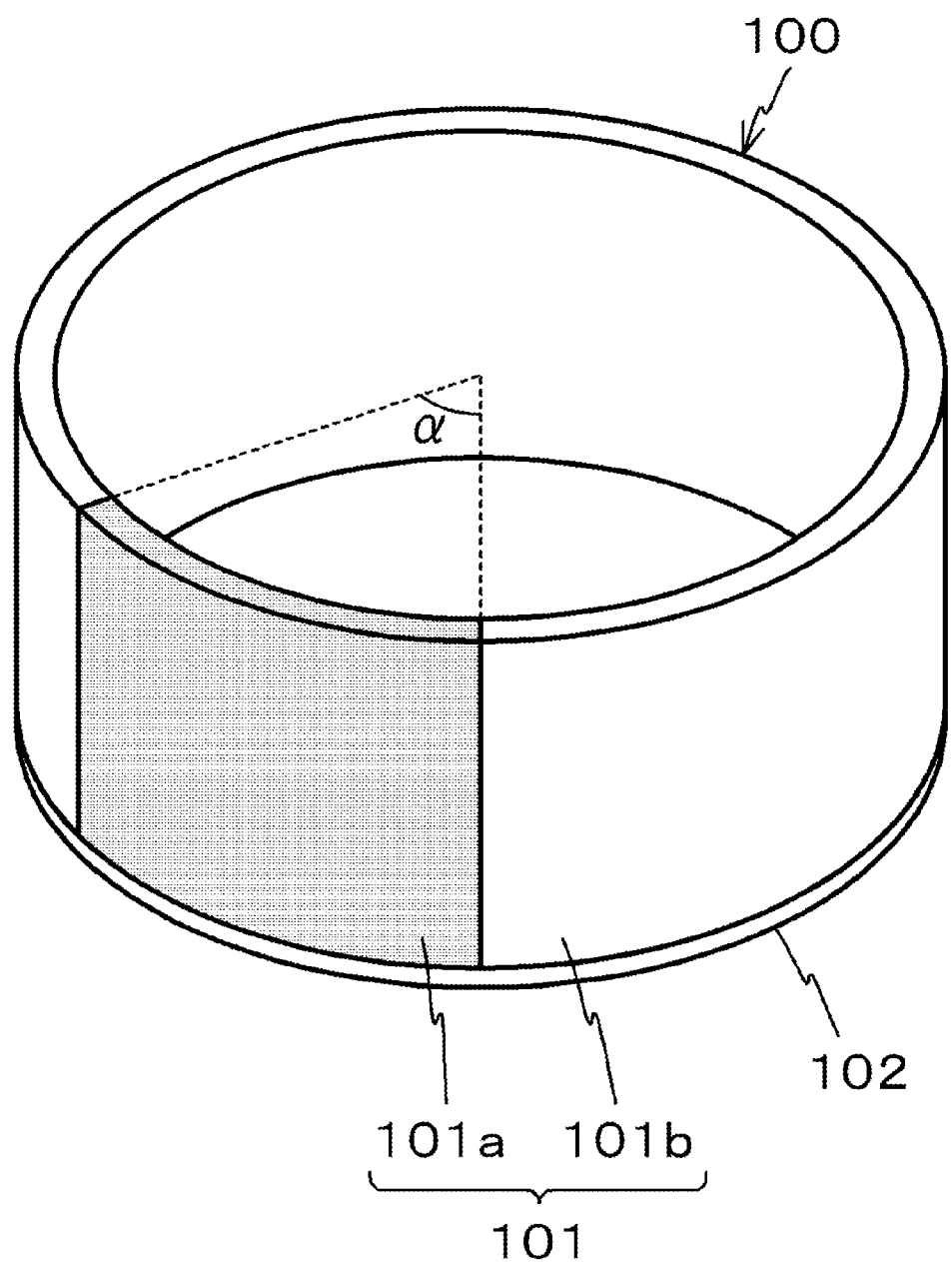
FIG. 5 is a perspective view of a verification apparatus.

FIG. 5 is a drawing showing a verification apparatus 100 which was used to verify the fact that insect pests are attracted to the edge. As shown in FIG. 5, the verification apparatus 100 comprises an annular frame 101 and a base plate 102 which seals the lower side of the frame 101.

In the frame 101, a light-transmitting section 101a is formed along an arc having a central angle α of 60°. This light-transmitting section 101a is made of a white resin. Further, a body 101b of the frame 101, except the light-transmitting section 101a, is made of a black or navy-blue resin. On the inner surface of this frame 101, an edge appears due to a contrast of light formed along each boundary between the light-transmitting section 101a and the body 101b.

Figure 6:
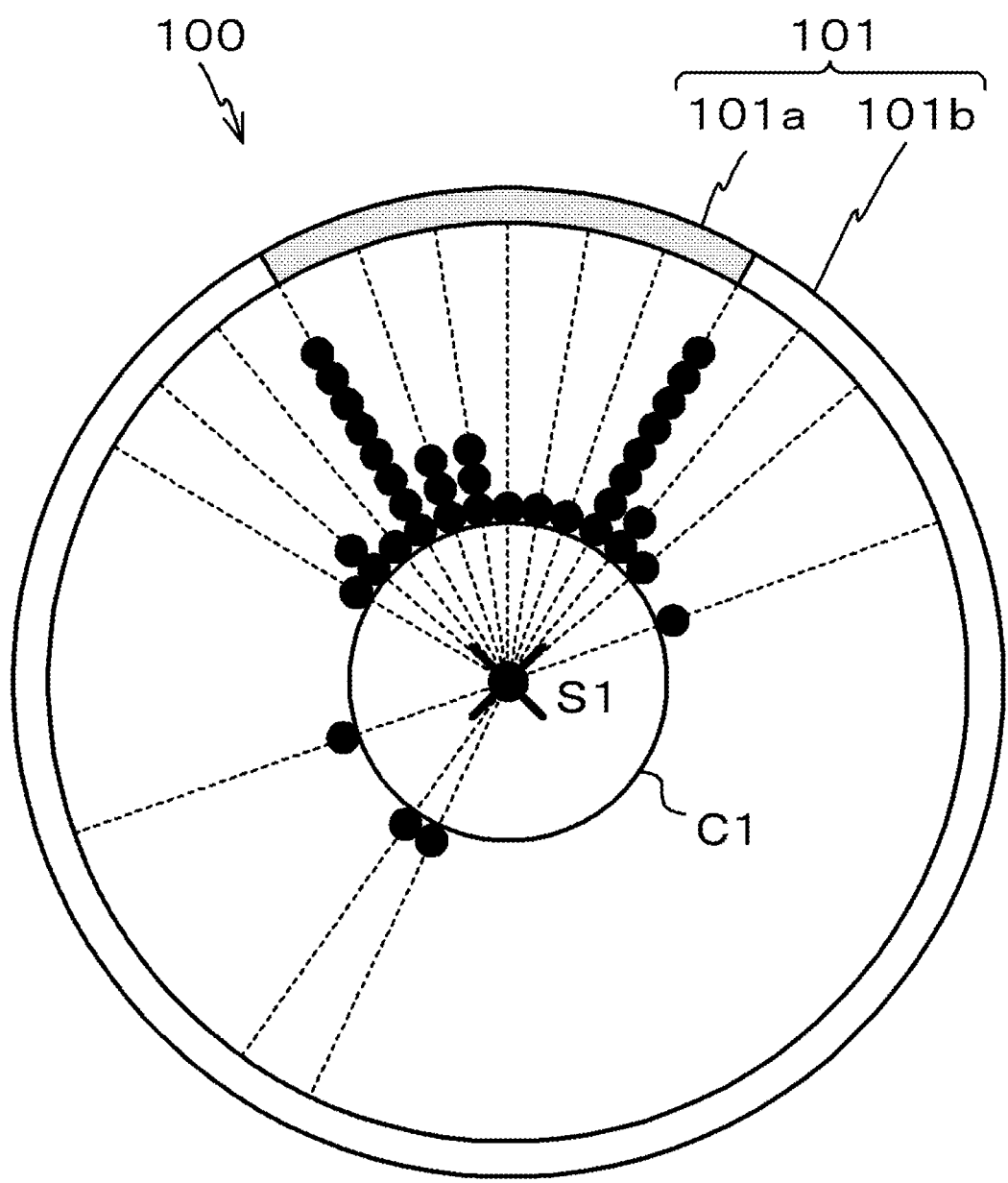
FIG. 6 is a drawing showing the movement results of brown-winged green stink bug (*Plautia stali* Scott)

At a center point S1 inside the horizontally-arranged verification apparatus 100, the present inventors released a plurality of brown-winged green stink bugs that were made incapable of flying by cutting off their wings and then observed the direction of the movement of each stink bug. FIG. 6 is a drawing showing the movement results of the stink bugs. In FIG. 6, each filled circle located around a circle C1 means that a stink bug moved from the point S1 along the dashed line running through the filled circle. Further, where filled circles are drawn in series in the same direction, the number thereof indicates the number of stink bugs that moved in the direction corresponding to the filled circles. For instance, the eight consecutive filled circles drawn in the upper right of the circle C1 means that eight stink bugs moved along the dashed line running through these filled circles.

As seen from FIG. 6, the vast majority of the stink bugs moving from the point S1 headed toward the boundaries between the light-transmitting section 101a and the body 101b of the frame 101, that is, the edges formed by the light-transmitting section 101a and the body 101b of the frame 101.

Figure 7:
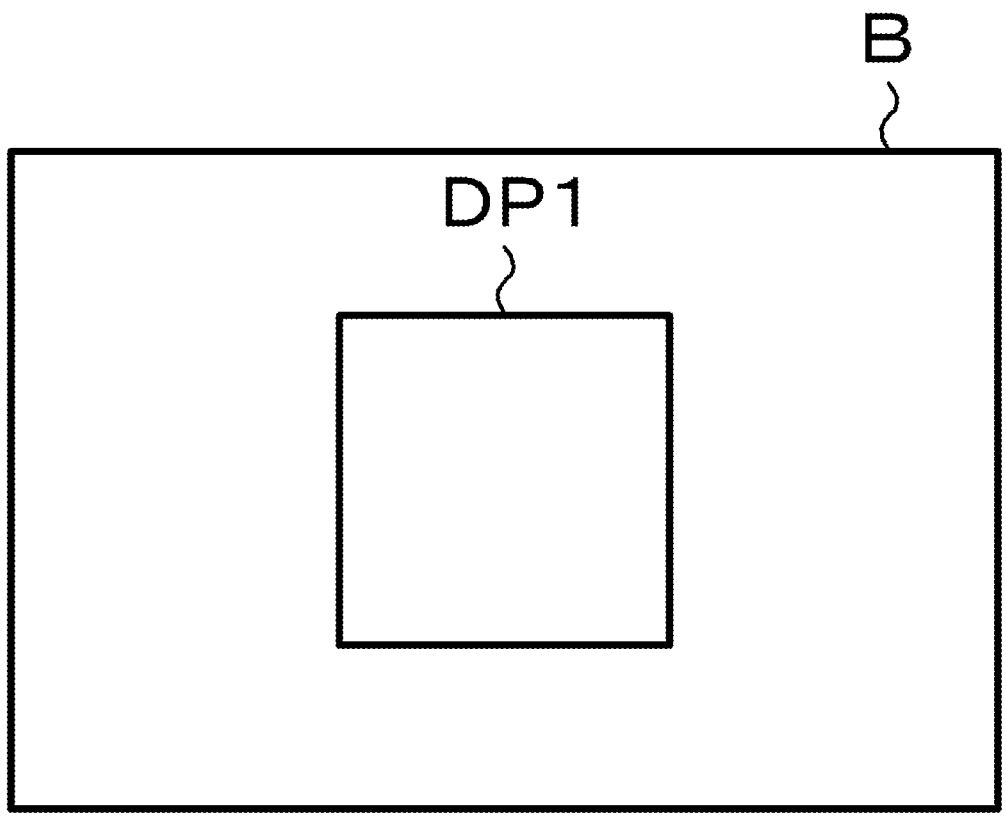
FIG. 7 is a drawing showing a diffuser panel arranged on a background plate.

In addition, the present inventors also verified the fact that plural kinds of insect pests are attracted to such an edge. Specifically, as shown in FIG. 7, the present inventors arranged a diffuser panel DP1 on a background plate B painted in solid black. Then, in a dark room, the present inventors irradiated the diffuser panel DP1 with white light from the backside to allow the diffuser panel DP1 to emit light. The present inventors released three species of insect pests from a point at a prescribed distance away from the light-emitting diffuser panel DP1 and examined the positions at which each species of insect pest collided with the background plate B and the diffuser panel DP1. The three species of insect pests were: polished green stink bug belonging to the order Hemiptera; cotton bollworm belonging to the order Lepidoptera; and sugarcane white grub belonging to the order Coleoptera.

Figure 8:
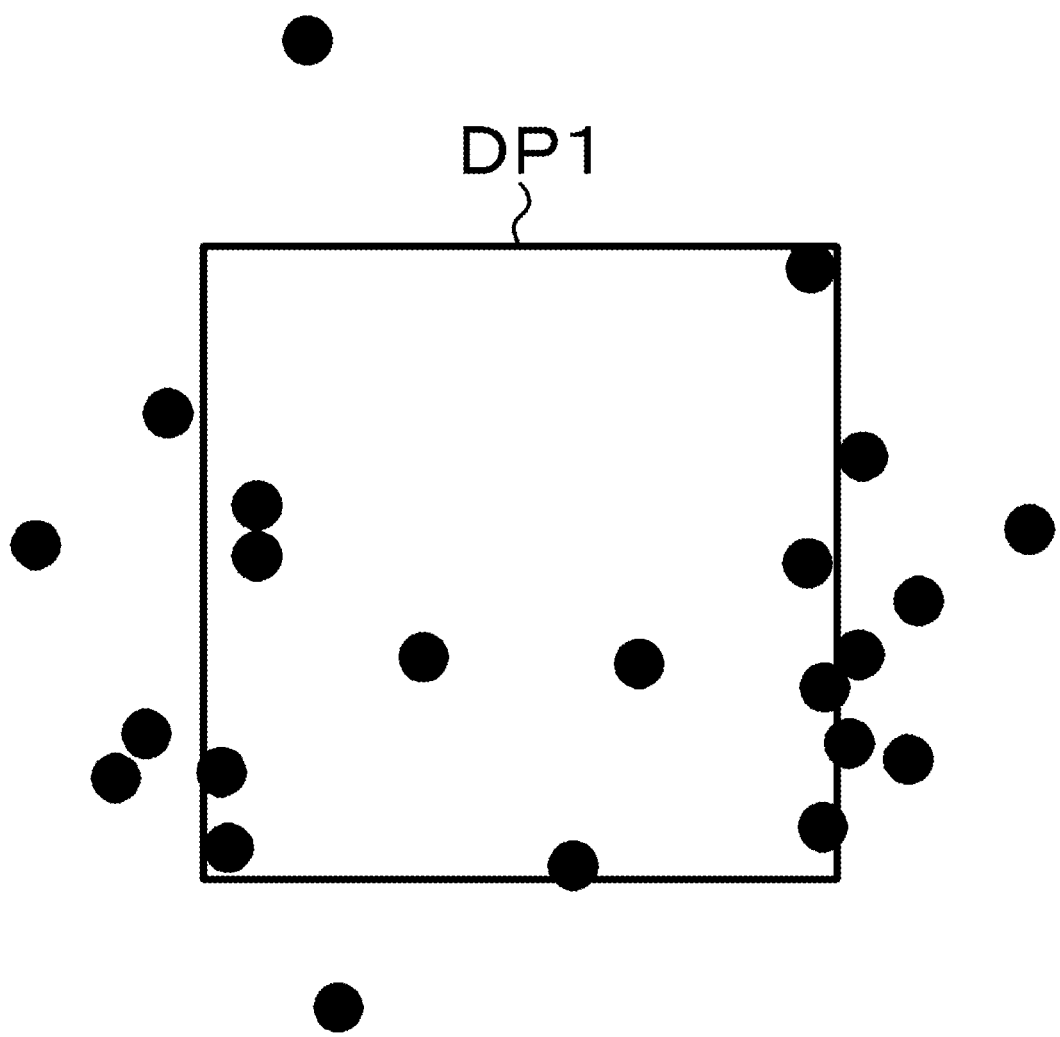
FIG. 8 is a drawing showing the results of investigating polished green stink bug (*Glaucias subpunctatus*)
Figure 9:
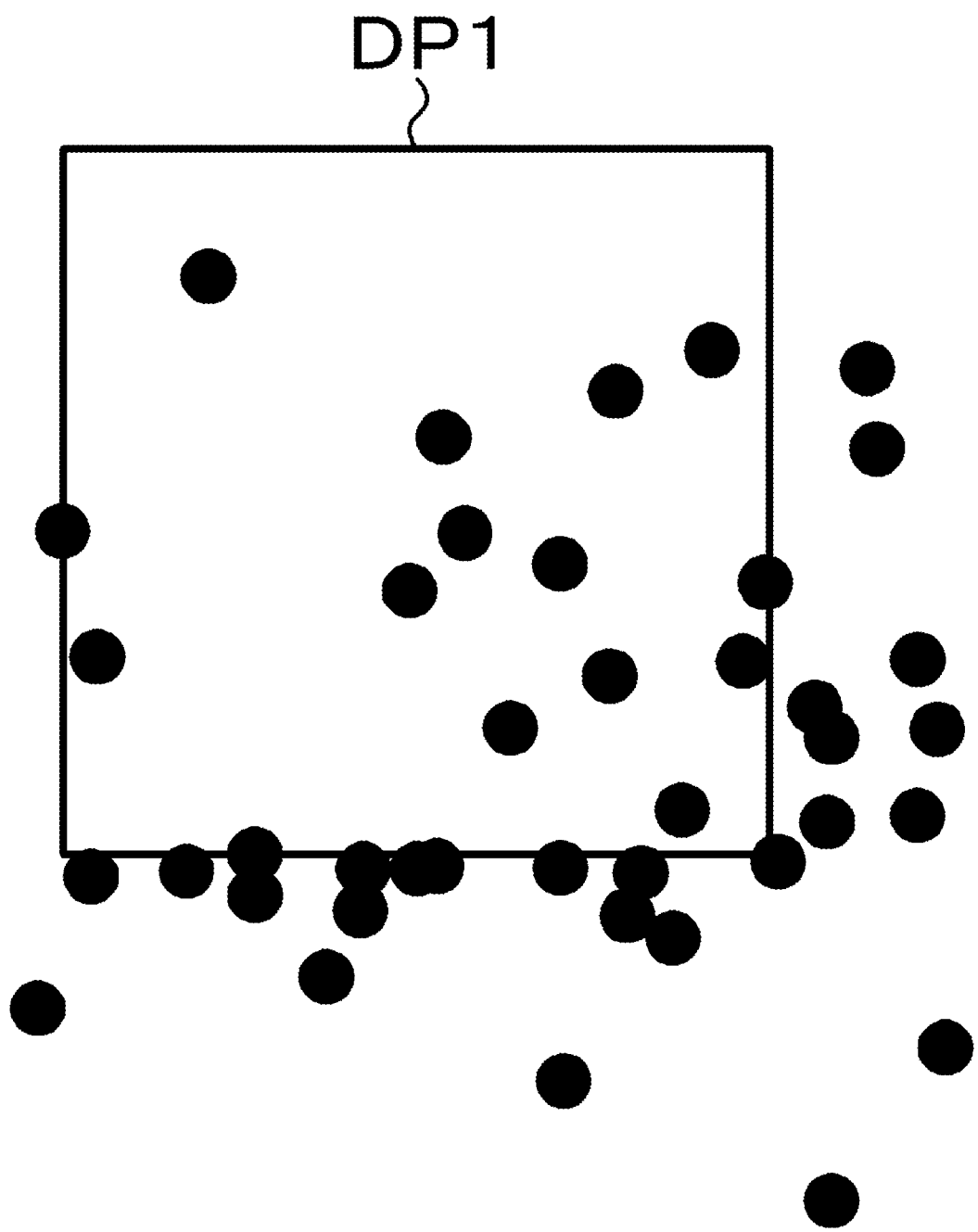
FIG. 9 is a drawing showing the results of investigating cotton bollworm (*Helicoverpa armigera*)
Figure 10:
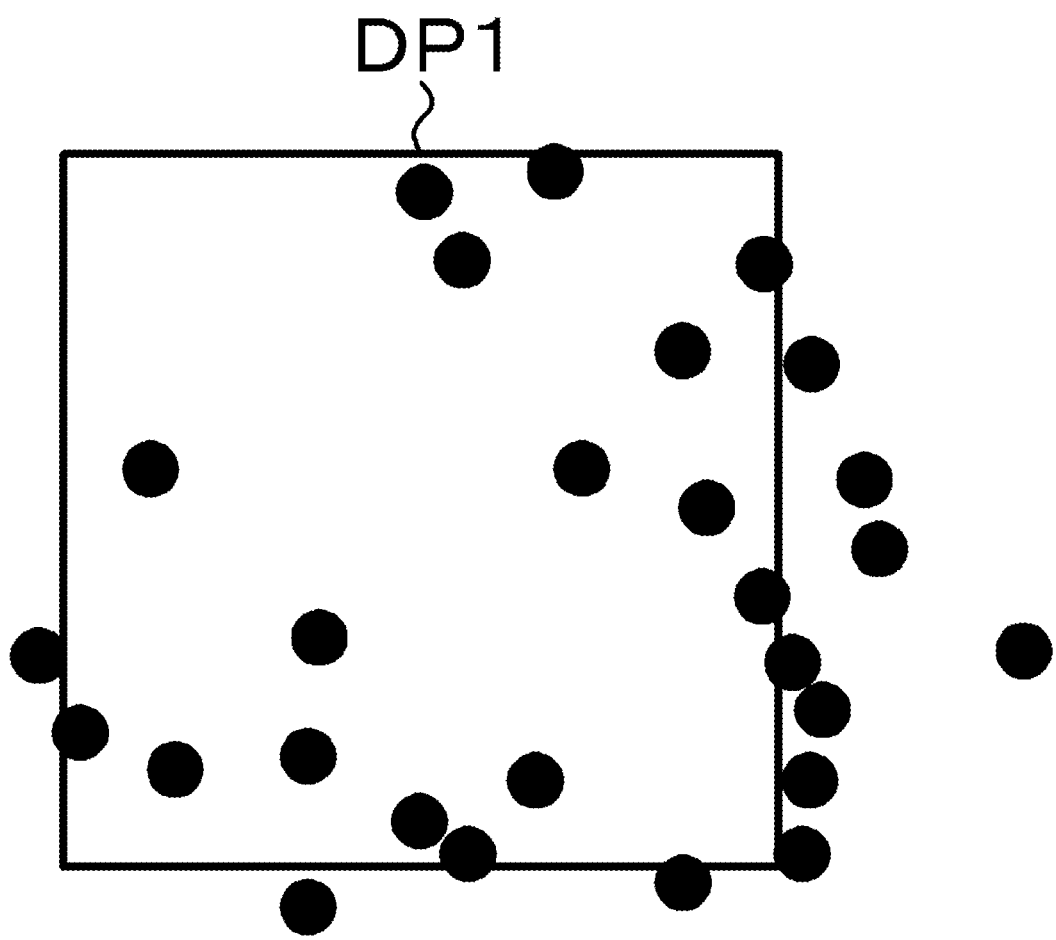
FIG. 10 is a drawing showing the results of investigating sugarcane white grub (*Anomala albopilosa*)

FIG. 8 is a drawing showing the investigation results of polished green stink bug. Further, FIGS. 9 and 10 show the investigation results of cotton bollworm and sugarcane white grub, respectively. In FIGS. 8 to 10, the filled circles represent the collision positions of the insect pests. As seen from FIGS. 8 to 10, these species of insect pests all had a tendency to collide in the vicinity of the edge between the background plate B and the diffuser panel DP1. Accordingly, it can be speculated that insect pests, regardless of their taxonomic groups, have a general property of orienting themselves toward such an edge.

Therefore, it is understood that the attraction device 10 according to this embodiment in which an edge is formed in the vertical direction on the boundary between the plates 31 and 32 is capable of inducing insect pests to move toward the center of the insect-capturing means and can thus attract insect pests more efficiently as compared to, for example, a case where a monochromatic light or the like is used to attract insect pests.

In the attraction device 10 according to this embodiment, an edge is formed by the plate 31 which primarily transmits ultraviolet light having a wavelength of about 370 nm and the plate 32 which primarily transmits green light having a wavelength of about 520 nm. Therefore, the attraction device 10 can efficiently attract insect pests. The effects of using the attraction device 10 according to this embodiment will now be described below.

Figure 11:
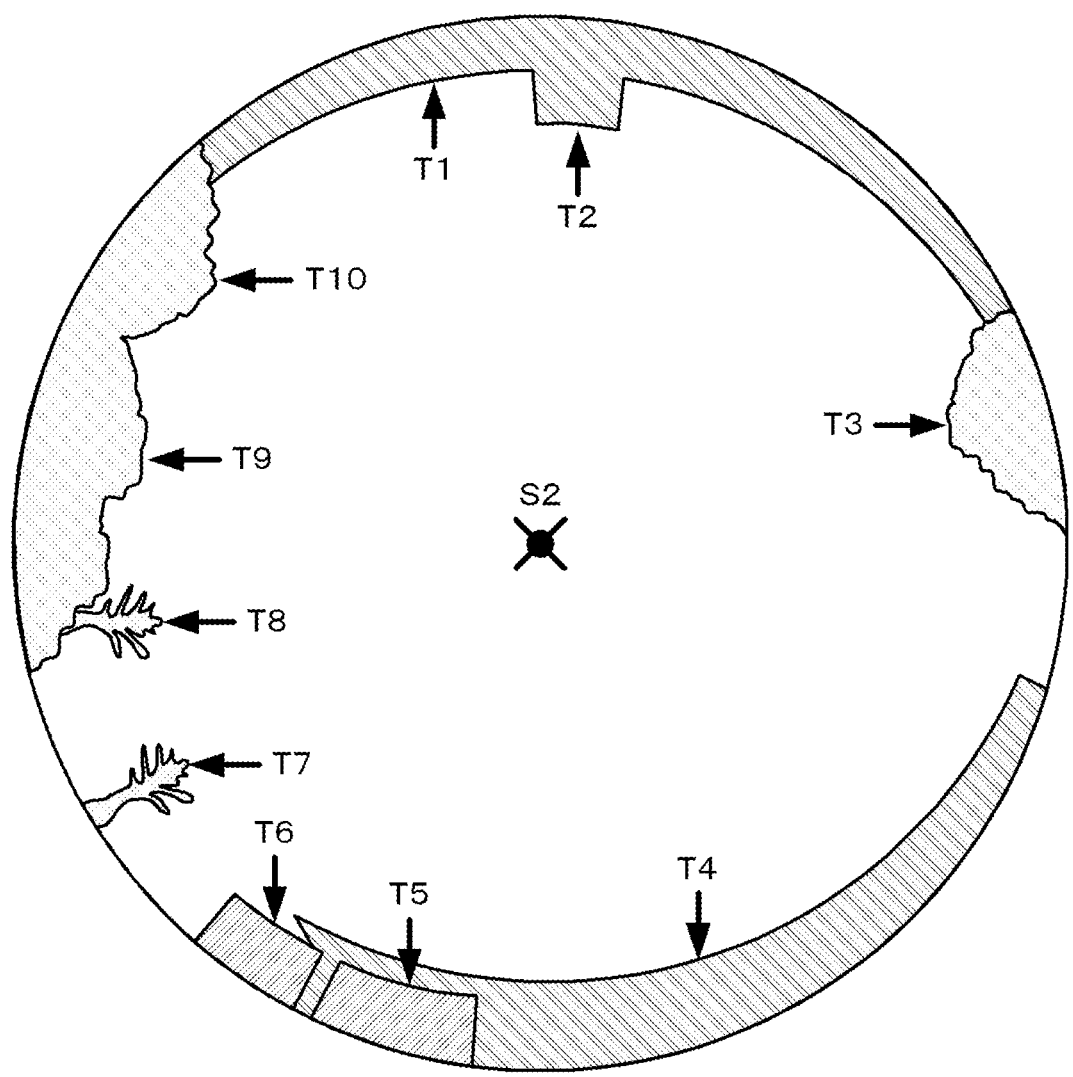
FIG. 11 is a drawing which schematically shows the arrangement of objects.
Figure 11:
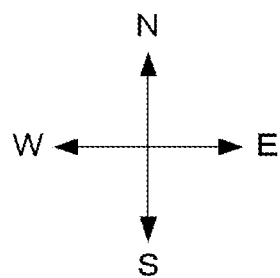

FIG. 11 is a drawing which schematically shows the arrangement of objects having a point S2 as the center thereof. Objects T1 to T10 shown in FIG. 11 are located surrounding the point S2. The objects T1, T2, T4, T5 and T6 are artifacts and the objects T3, T7, T8, T9 and T10 are natural objects such as trees.

Specifically, the objects T1 and T4 are building structures made of reinforced concrete. The object T2 is a water tower placed on the object T1. The objects T5 and T6 are air conditioner outdoor units that are installed outside the object T4. Further, the objects T3, T9 and T10 are American sweetgum (trees) and the objects T7 and T8 are *Metasequoia* (trees).

Figure 12:
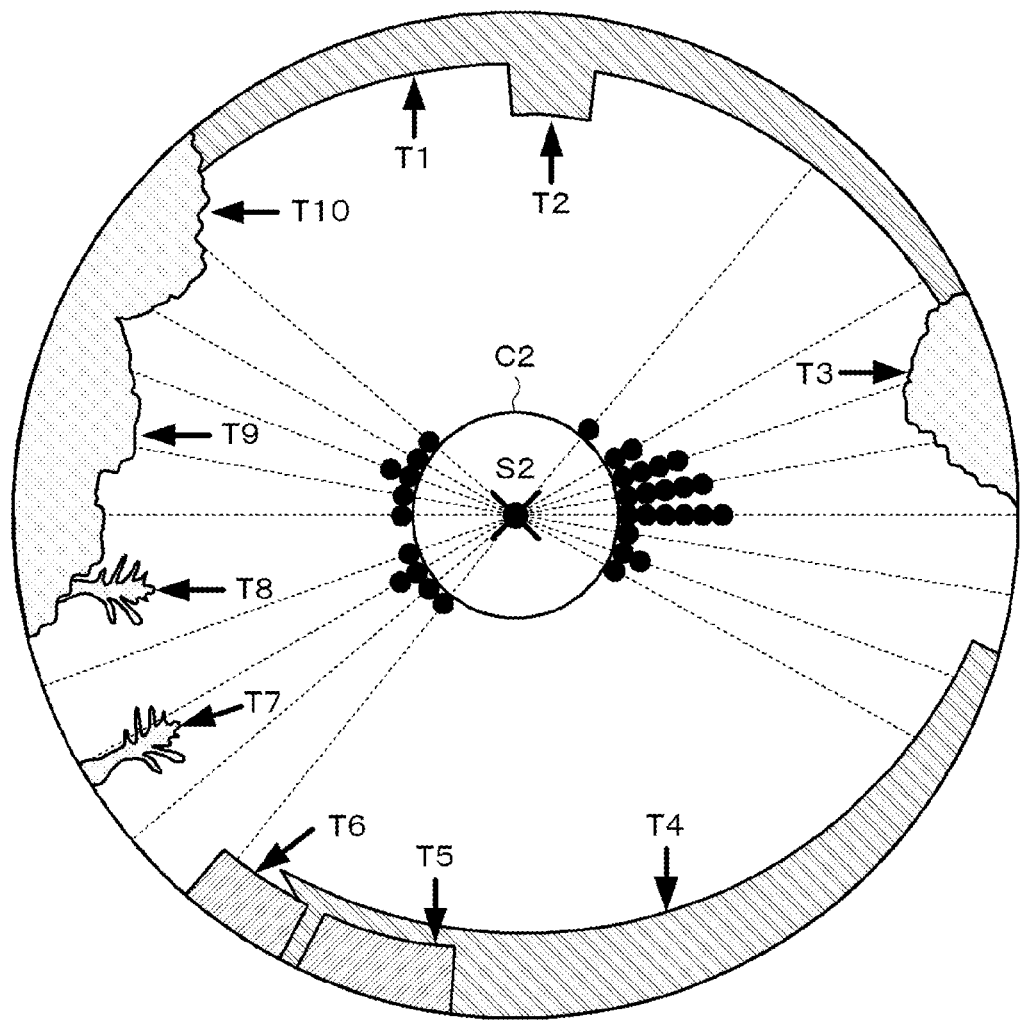
FIG. 12 is a drawing showing the flight results of brown-winged green stink bugs.
Figure 12:
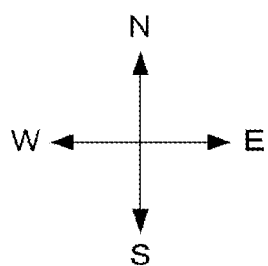

The present inventors allowed a plurality of brown-winged green stink bugs to fly from the point S2 shown in FIG. 11 and observed the direction of the flight of each stink bug. FIG. 12 is a drawing showing the flight results of the stink bugs under a clear sky. In FIG. 12, each filled circle located around a circle C2 means that a stink bug flew from the point S2 along the dashed line running through the filled circle. Further, where filled circles are drawn in series in the same direction, the number thereof indicates the number of stink bugs that flew in the direction corresponding to the filled circles. For instance, the six consecutive filled circles drawn in right side (east) of the circle C2 means that six stink bugs flew east along the dashed line running through these filled circles.

As seen from FIG. 12, the vast majority of the stink bugs flying from the point S2 headed toward a specific object T3, T7, T8, T9 or T10 representing a natural object. From this result, it is understood that stink bugs strongly orient themselves toward a specific object. This orientation toward a specific object is influenced by weather. For instance, under a cloudy sky, the orientation tendency toward a specific object turns out to be weakened.

Figure 13:
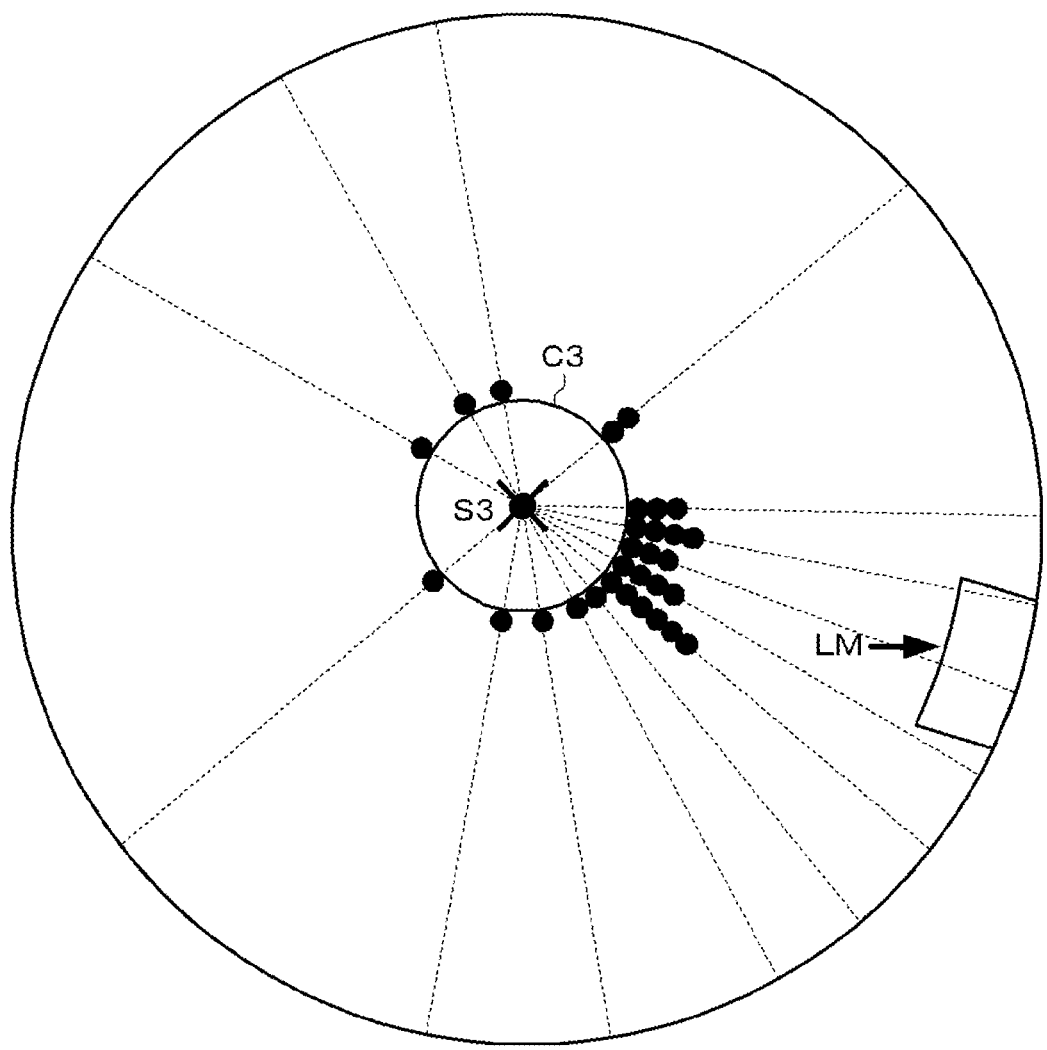
FIG. 13 is a drawing showing the position of a landmark.

From the above-described results shown in FIG. 12, it is thought that stink bugs are attracted to green light close to the color of tree leaves. In view of this, the present inventors placed a rectangular landmark LM made of a green cloth in an open space having a small number of objects. FIG. 13 is a drawing which schematically shows the positional relationship between a point S3 and the landmark LM. As shown in FIG. 13, the landmark LM was placed in the southeast of the point S3.

Figure 14:
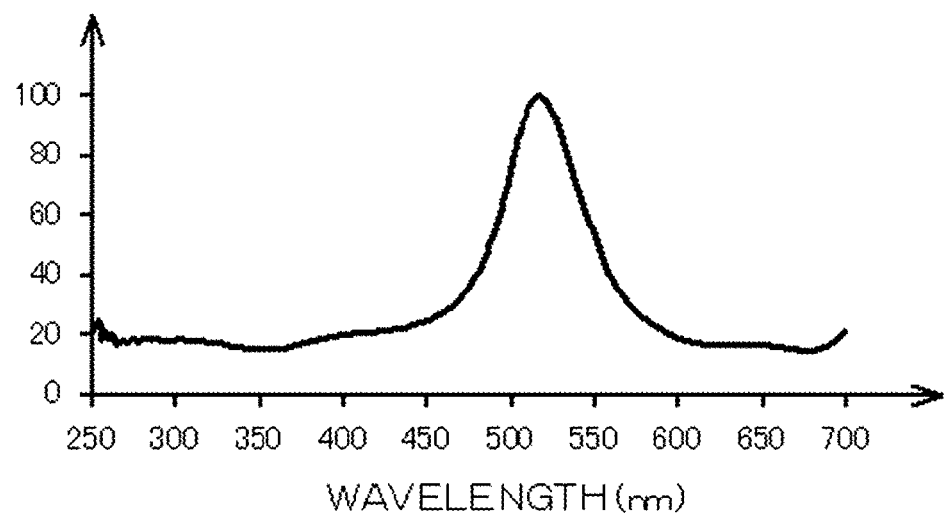
FIG. 14 is a drawing which shows the reflection spectrum of a cloth used as the landmark.

FIG. 14 is a drawing which shows the reflection spectrum of the cloth used as the landmark LM. As shown in FIG. 14, among incoming natural light, this cloth has high reflectance for light of about 500 nm to 550 nm in wavelength. Therefore, the landmark LM is visually recognized in a color equivalent to the color of tree leaves.

The present inventors allowed a plurality of stink bugs to fly from the point S3 shown in FIG. 13 and observed the direction of the flight of each stink bug. In FIG. 13, each filled circle located around a circle C3 means that a stink bug flew from the point S3 along the dashed line running through the filled circle. Further, where filled circles are drawn in series in the same direction, the number thereof indicates the number of stink bugs that flew in the direction corresponding to the filled circles. As seen from FIG. 13, the vast majority of the stink bugs flying from the point S3 headed toward the landmark LM.

Figure 15:
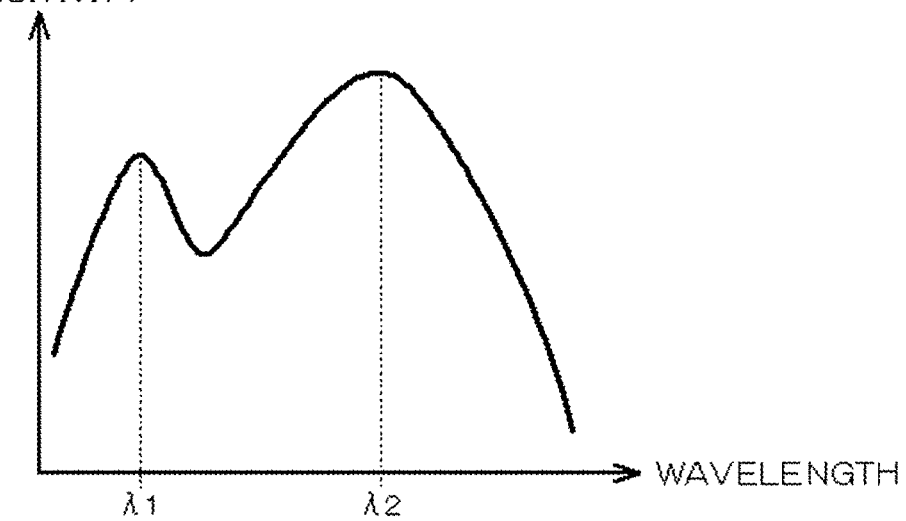
FIG. 15 is a drawing which shows a characteristic curve representing the sensitivity of an insect compound eye.

FIG. 15 is a drawing which shows a characteristic curve representing the sensitivity of an insect compound eye. In FIG. 15, the value of $\lambda 1$ is about 350 nm and the value of $\lambda 2$ is about 530 nm. Generally, insect compound eyes have strong sensitivity to ultraviolet light and green light. That is, the characteristic curve of FIG. 15 has peaks near the wavelength $\lambda 1$ and the wavelength $\lambda 2$. Therefore, a hypothesis is made that the reason why stink bugs fly toward the landmark LM is because they orient themselves toward an edge formed by ultraviolet light coming from the sky and the green light reflected from the landmark LM.

Figure 16:
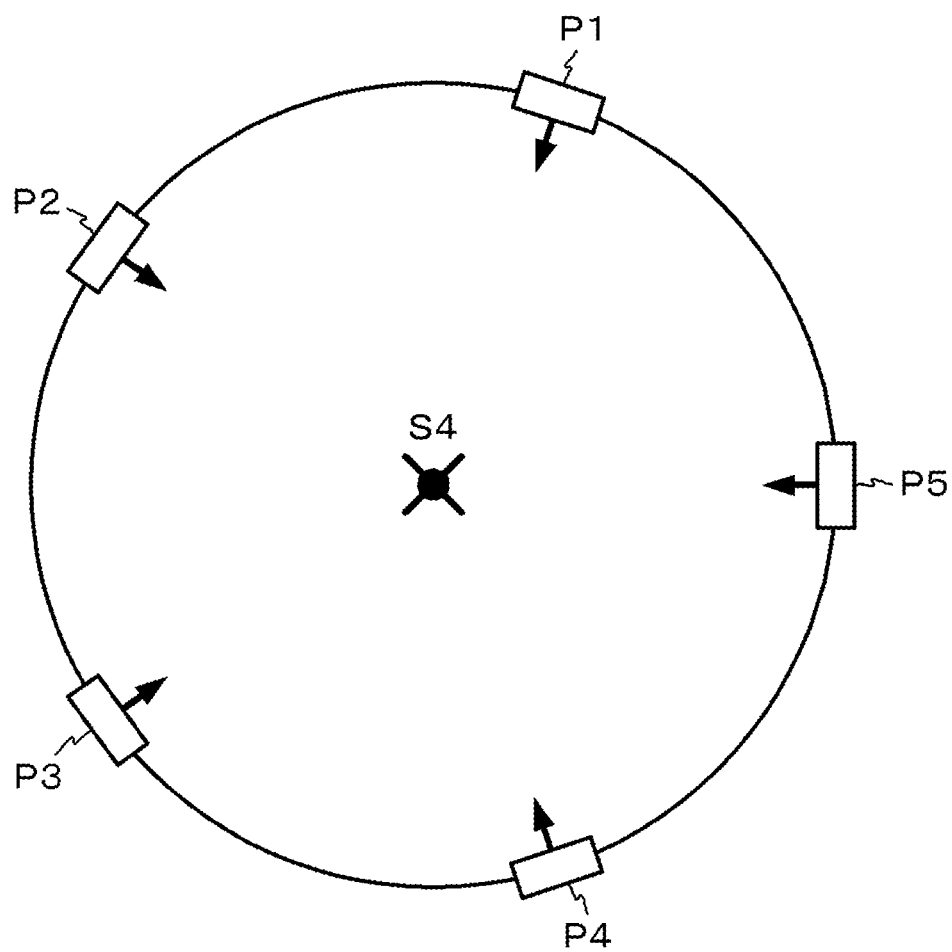
FIG. 16 is a drawing showing the arrangement of LED panels.
Figure 17:
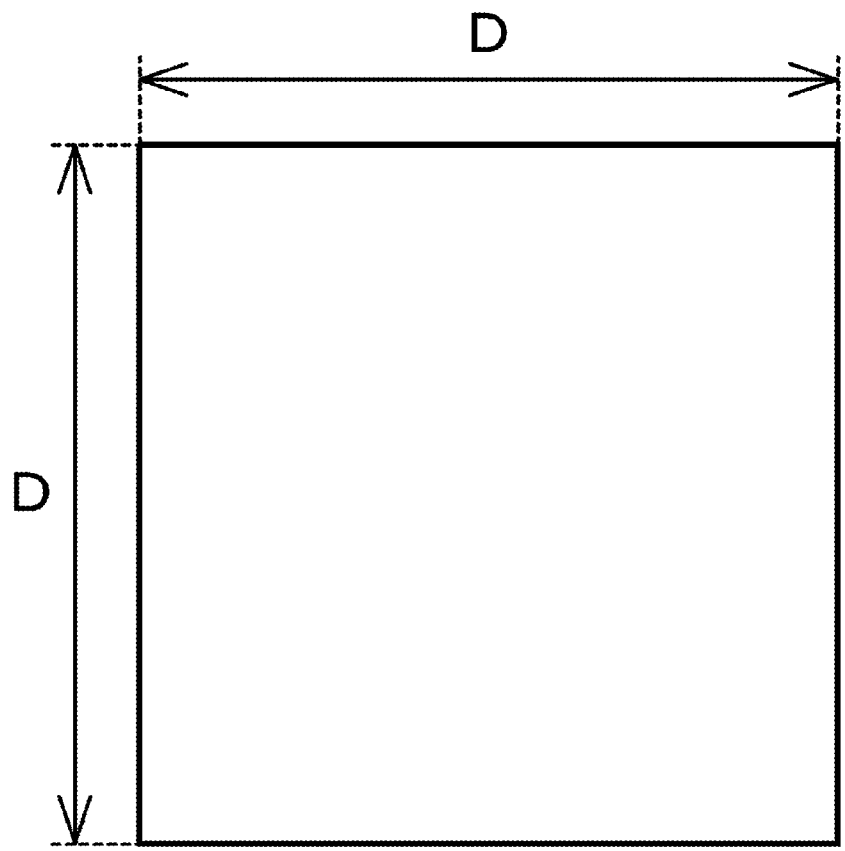
FIG. 17 is a drawing showing a light-emitting surface of the LED panels.

In view of this, the present inventors performed verification for supporting this hypothesis. In FIG. 16, five LED panels P1 to P5, which are arranged along a circle whose center is a point S4, are shown. As shown in, for example, FIG. 17, the LED panels P1 to P5 each has a square light-emitting surface. This light-emitting surface has a size of 26 mm in width D and 26 mm in length D.

The LED panel P1 emits illumination light (ultraviolet) having a wavelength of 375 nm. The LED panel P2 emits illumination light (blue) having a wavelength of 450 nm. The LED panel P3 emits illumination light (blue) having a wavelength of 470 nm. The LED panel P4 emits illumination light (green) having a wavelength of 525 nm. The LED panel P5 emits illumination light (yellow) having a wavelength of 590 nm. Further, these illumination lights are emitted from the respective LED panels P1 to P5 toward the point S4.

Figure 18:
FIG. 18 shows the observation results that were obtained when five LED panels were illuminated.
Figure 19:
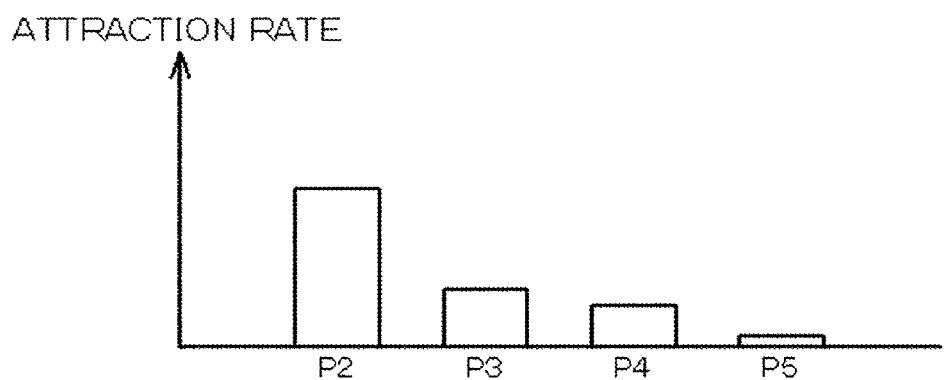
FIG. 19 shows the observation results that were obtained when four LED panels were illuminated.
Figure 20:
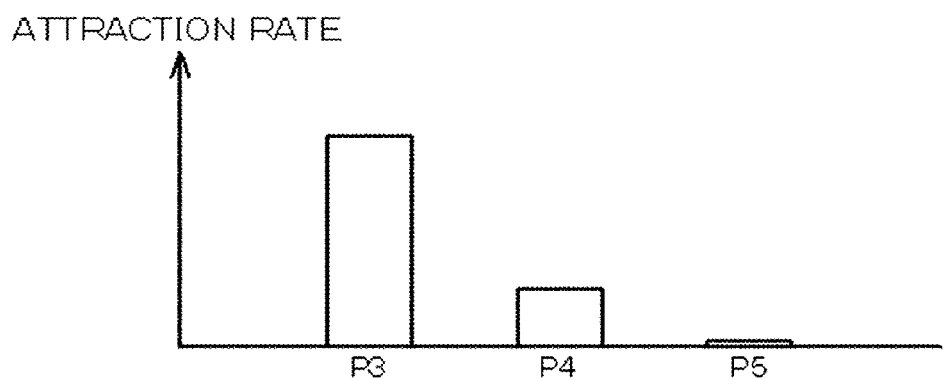
FIG. 20 shows the observation results that were obtained when three LED panels were illuminated.
Figure 21:
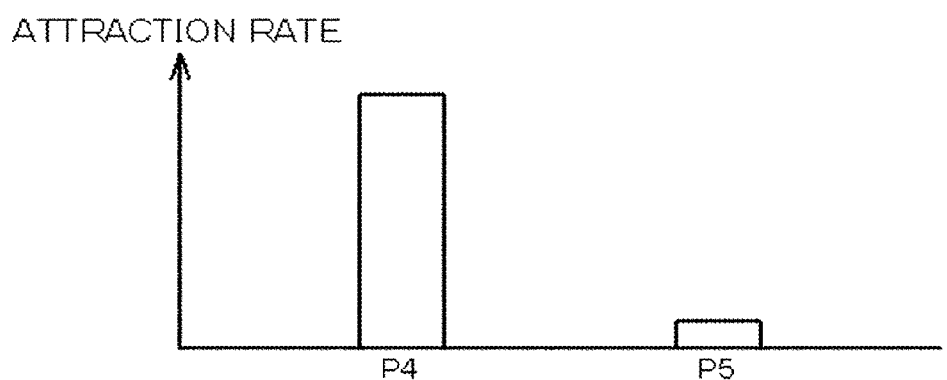
FIG. 21 shows the observation results that were obtained when two LED panels were illuminated.

First, the present inventors allowed a plurality of stink bugs to fly from the point S4 shown in FIG. 16 and observed which LED panel each stink bug flew toward. FIG. 18 shows the observation results that were obtained in a condition where all of the five LED panels P1 to P5 were illuminated. FIG. 19 shows the observation results that were obtained in a condition where four LED panels P2 to P5 were illuminated. FIG. 20 shows the observation results that were obtained in a condition where three LED panels P3 to P5 were illuminated. FIG. 21 shows the observation results that were obtained in a condition where two LED panels P4 and P5 were illuminated. It is noted here that, in these figures, the attraction rate was determined by dividing the number of stink bugs flew to the subject LED panel by the total number of stink bugs that were allowed to fly.

As seen from FIGS. 18 to 21, the stink bugs flying from the point S4 were preferentially attracted to an LED panel emitting illumination light having a shorter wavelength.

Figure 22:
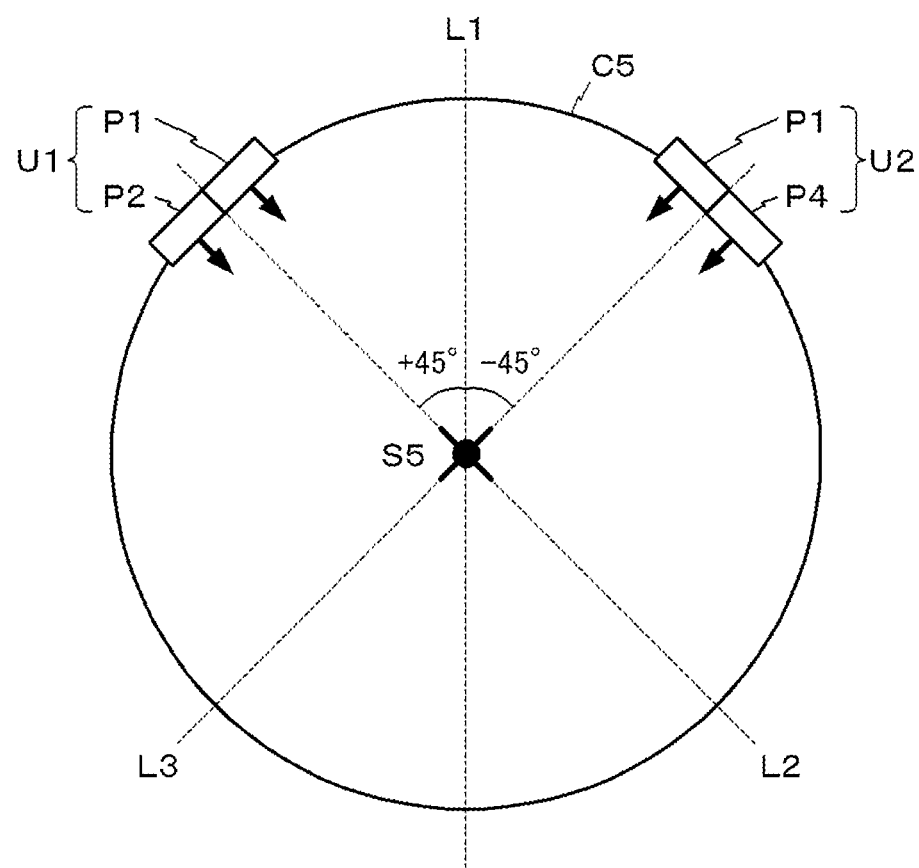
FIG. 22 is a drawing which shows the arrangement of units each constituted by a pair of LED panels.

Next, as shown in FIG. 22, the present inventors arranged a unit U1 comprising a combination of the LED panels P1 and P2 and a unit U2 comprising a combination of the LED panels P1 and P4 on each side of a point S5. Then, the present inventors allowed a plurality of stink bugs to fly from the point S5 and observed the direction of the flight of each stink bug.

Figure 23:
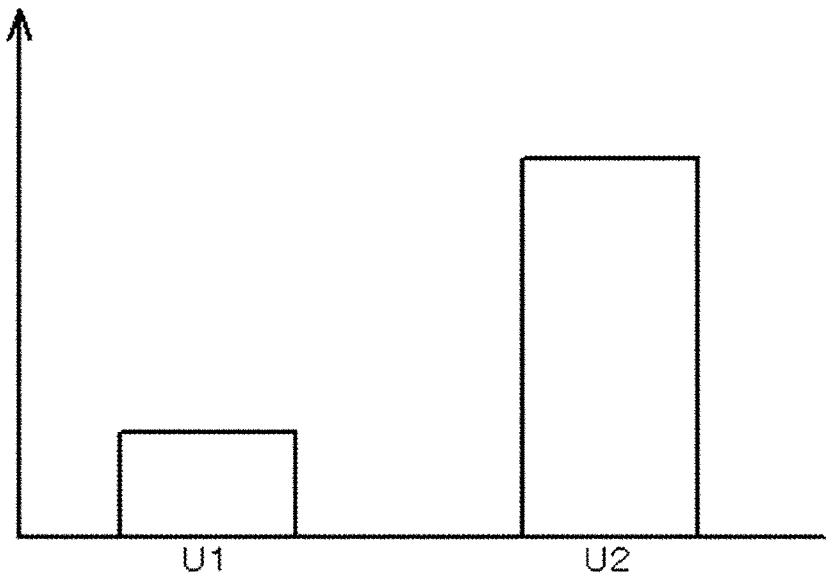
FIG. 23 shows the observation results that were obtained when the units were illuminated.

As shown in FIG. 23, the number of stink bugs that flew toward the unit U2 was about three times the number of stink bugs that flew toward the unit U1.

From the observation results shown in FIGS. 18 to 21, it is seen that, for a monochromatic light source, stink bugs tend to be attracted to light having a short wavelength. Meanwhile, from the observation results shown in FIG. 23, it is seen that stink bugs tend to be attracted more strongly to a combination of light sources each having a specific wavelength than to a combination of light sources each having a short wavelength. Accordingly, as a combination of light sources, it can be speculated that a combination of light sources each emitting light with a wavelength corresponding to a peak of the characteristic curve showing the sensitivity of an insect compound eye has the highest attraction effect.

In the attraction device 10 according to this embodiment, an edge is formed by the plate 31 which primarily transmits ultraviolet light having a wavelength of about 370 nm and the plate 32 which primarily transmits green light having a wavelength of about 520 nm. In other words, an edge is formed by a combination of the plates 31 and 32, each of which transmits light having a wavelength corresponding to a peak of the characteristic curve showing the sensitivity of an insect compound eye. Therefore, the attraction device 10 according to this embodiment realizes a high attraction effect and can thus efficiently attract insect pests.

Figure 24:
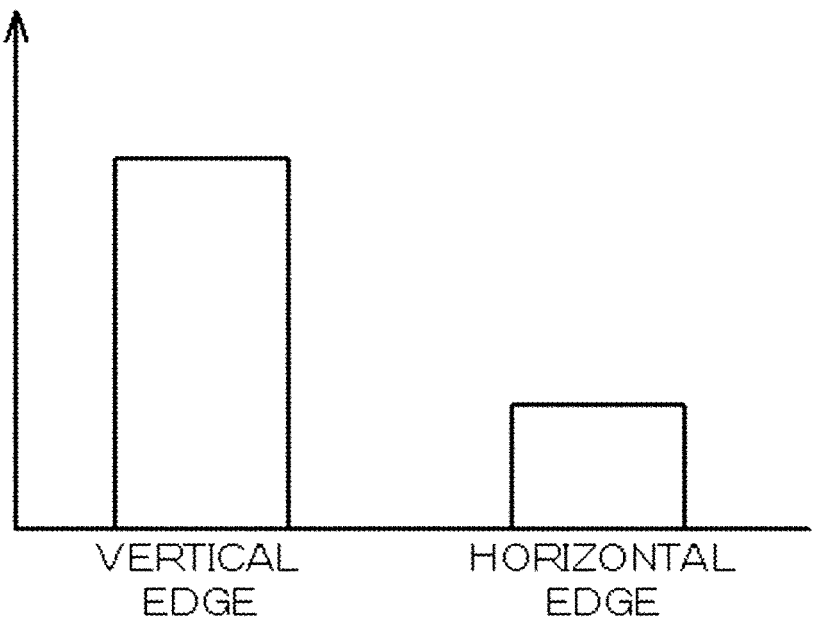
FIG. 24 shows the attraction rates of the vertical and horizontal edges.

In the attraction device 10 according to this embodiment, a vertical edge substantially parallel to a plumb line is formed by the plates 31 and 32. Therefore, the attraction device 10 can efficiently attract insect pests. For instance, as shown in FIG. 24, the number of stink bugs attracted to a vertical edge parallel to a plumb line was about three times the number of stink bugs attracted to a horizontal edge perpendicular to the plumb line. Accordingly, it is understood that the attraction device 10 according to this embodiment in which an edge is formed in the vertical direction on the boundary between the plates 31 and 32 is capable of efficiently attracting insect pests.

Second Embodiment

Next, the second embodiment of the present disclosure will be described referring to the drawings. It is noted here that, for those constitutions that are identical or equivalent to the first embodiment, the same symbols are used and descriptions thereof are omitted or simplified.

Figure 25:
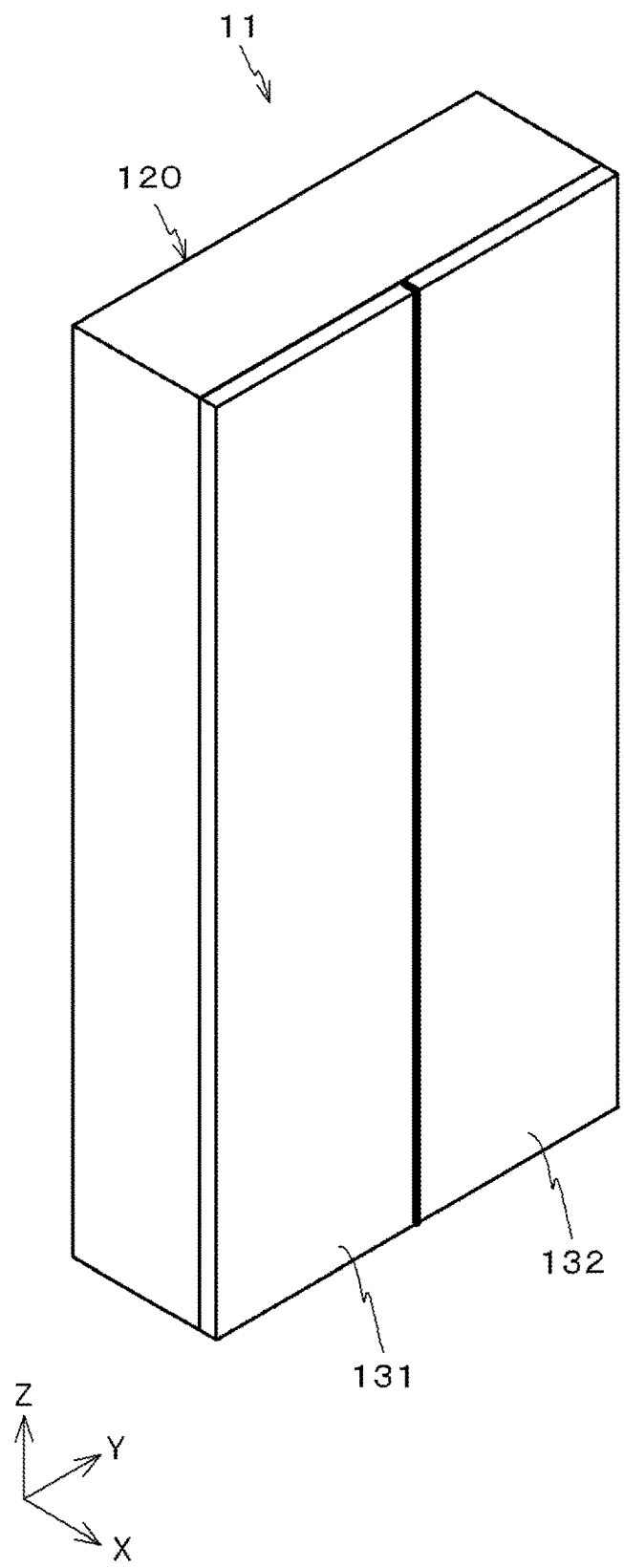
FIG. 25 is a perspective view showing the attraction device according to the second embodiment.

FIG. 25 is a perspective view of an attraction device 11 according to this embodiment. The attraction device 11 according to this embodiment is different from the above-described attraction device 10 according to the first embodiment in that an edge is formed by color-mixed light and monochromatic light. As shown in FIG. 25, the attraction device 11 comprises a rectangular chassis 120 and rectangular plates 131 and 132, which are attached to the chassis 120.

Figure 26:
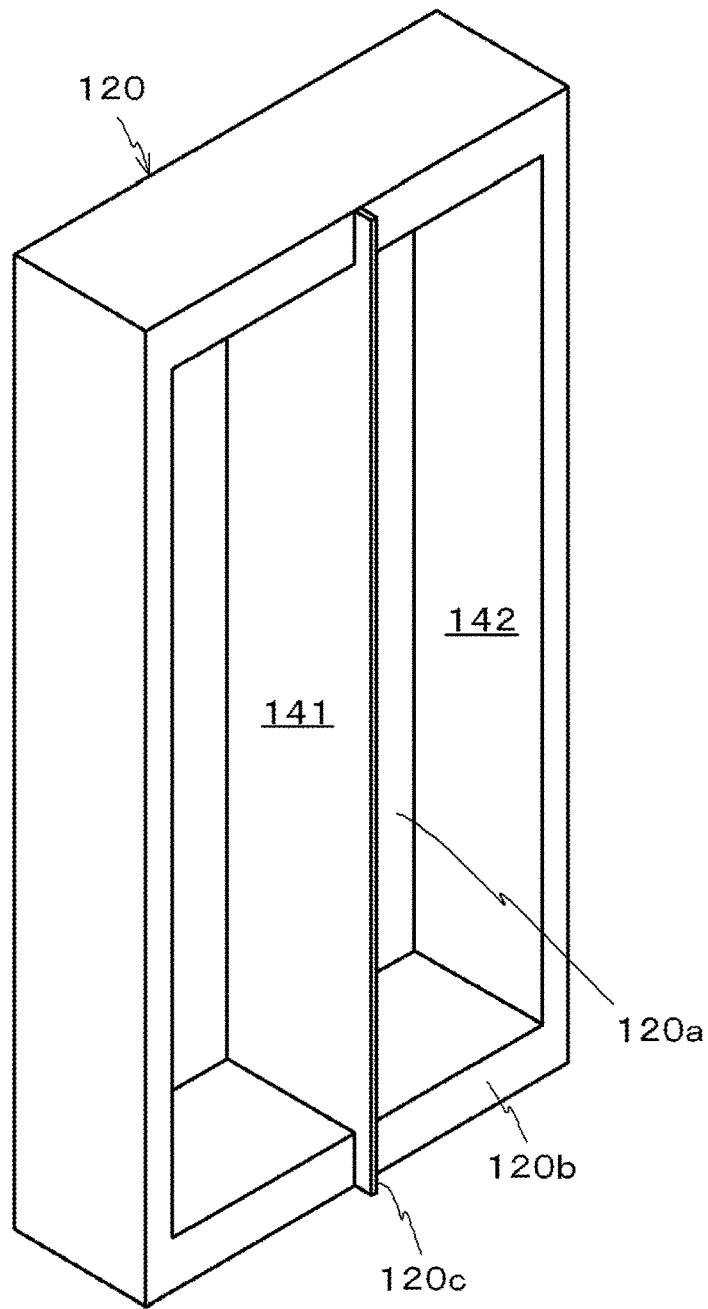
FIG. 26 is a perspective view showing a chassis.

FIG. 26 is a perspective view of the chassis 120. As shown in FIG. 26, the chassis 120 is a casing formed by, for example, injection molding of a resin. This chassis 120 comprises two parts: a base plate 120a and a rectangular frame 120b formed along the periphery of the base plate 120a. The space defined by the base plate 120a and the frame 120b are divided into two spaces, 141 and 142, by a thin inner wall 120c of about 0.2 mm in thickness. In these two spaces 141 and 142 formed in the chassis 120, LED units 121A and 121B which illuminate the plates 131 and 132 with light are housed, respectively.

Figure 27:
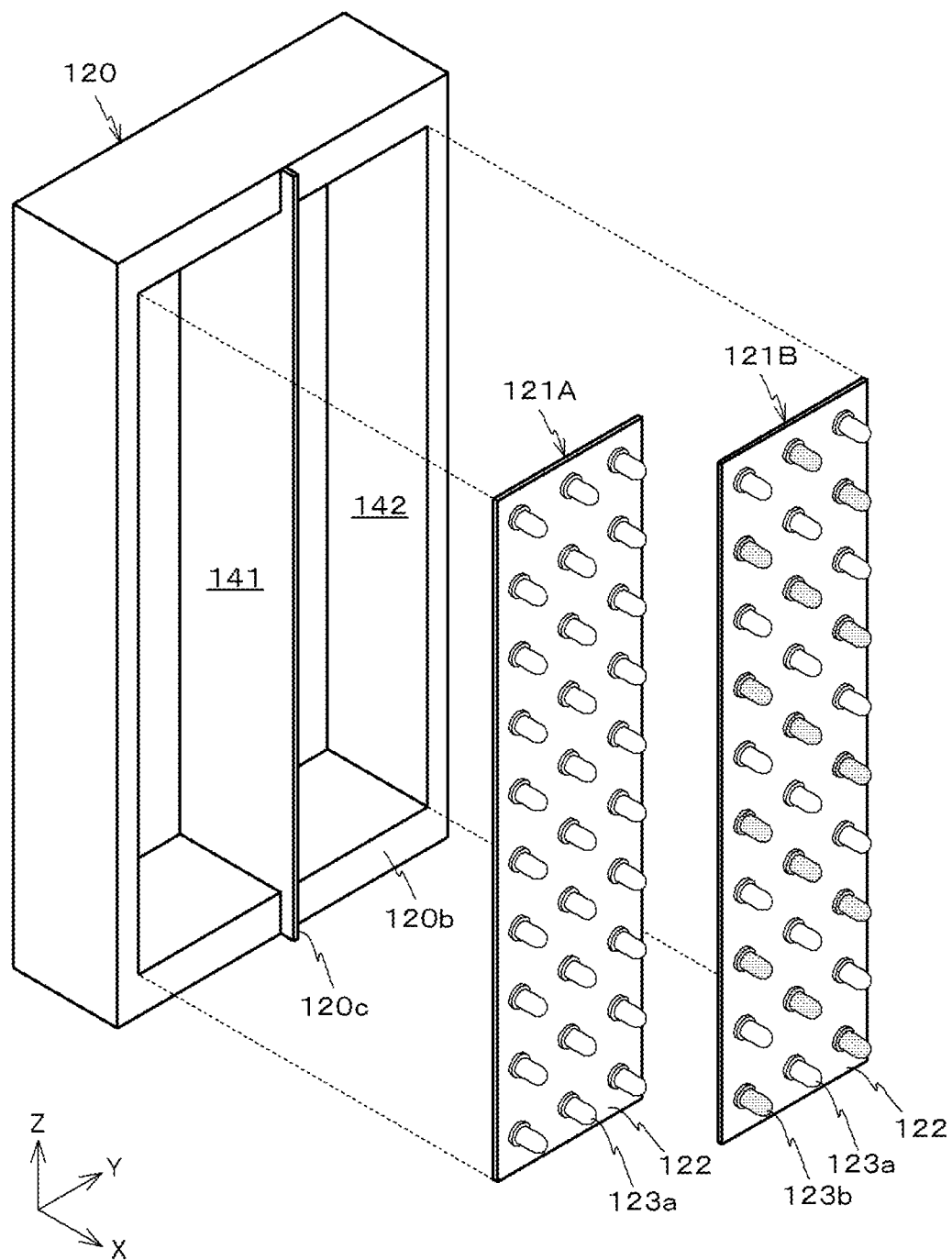
FIG. 27 is a perspective view showing the chassis and LED units.

FIG. 27 is a perspective view showing the LED units 121A and 121B along with the chassis 120. As shown in FIG. 27, the LED unit 121A comprises a printed wiring board 122 and a plurality of LED 123 as that are mounted on the printed wiring board 122. These LED 123as are arrayed on the printed wiring board 122 in the form of a matrix having 10 rows and 3 columns. Each LED 123a primarily emits green light having a wavelength of about 520 nm.

Further, in the same manner, the LED unit 121B also comprises a printed wiring board 122 and a plurality of LED 123as and 123bs that are mounted on the printed wiring board 122. These LEDs 123as and 123bs are arrayed on the printed wiring board 122 in the form of a matrix having 10 rows and 3 columns. The LED 123a primarily emits green light having a wavelength of about 520 nm, while the LED 123b primarily emits ultraviolet light having a wavelength of about 370 nm. Further, in the LED unit 121B, the LED 123as and the LED 123bs are each arranged adjacent to each other.

As seen from FIG. 27, the LED unit 121A constituted in the above-described manner is housed in the space 141 of the chassis 120 and the LED unit 121B is housed in the space 142 of the chassis 120.

The plates 131 and 132 are rectangular diffuser panels having a light-diffusing property. The plate 131 is fixed on the chassis 120 such that it seals the space 141. Also, the plate 132 is fixed on the chassis 120 such that it seals the space 142. As shown in FIG. 25, these plates 131 and 132, which are fixed on the chassis 20, are in a condition of being tightly adhered to the inner wall 120c.

The attraction device 11 constituted in the above-described manner is connected to, for example, a commercial power source via a power source cable not shown in the figure. Then, the LED 123as and 123bs constituting the LED units 121A and 121B are illuminated by electric power supplied from the commercial power source. Consequently, green light having a wavelength of about 520 nm is emitted from the LED unit 121A, and green light having a wavelength of about 520 nm as well as ultraviolet light having a wavelength of about 370 nm are emitted from the LED unit 121B.

The green light emitted from the LED unit 121A enters the plate 131 and is evenly diffused. Consequently, the plate 131 visually changes its color to green. Further, the green light and ultraviolet light that are emitted from the LED unit 121B enter the plate 132 and are evenly diffused. Thus, from the plate 132, a color-mixed light generated by the green light and ultraviolet light is diffused, and the plate 132 visually changes its color to a mixed color of green and violet. Consequently, on the boundary between the plates 131 and 132, an edge appears in the vertical direction due to a contrast between the green light and the color-mixed light generated by the green and ultraviolet lights.

As described above, in the attraction device 11 according to this embodiment, by the green light transmitting and diffusing through the plate 131 and the color-mixed light generated by the green light and ultraviolet light transmitting and diffusing through the plate 132, an edge is formed in the vertical direction on the boundary between the plates 131 and 132. Therefore, as compared to a case where a light source which emits a relatively large amount of light having a wavelength of 300 to 600 nm, such as a mercury lamp, is used, the attraction device 11 can attract insect pests more efficiently. The effects of using the attraction device 11 according to this embodiment will now be described below.

As in the case of the attraction device 10 according to the first embodiment, an edge formed by monochromatic lights such as green light and ultraviolet light exhibits an effect of efficiently attracting insect pests. However, as a result of intensive studies, the present inventors discovered that an edge formed by green light and color-mixed light of green and ultraviolet lights exhibits an insect pest-attracting effect that is higher than that of an edge formed by monochromatic lights.

First, as shown in FIG. 7, the present inventors arranged a diffuser panel DP1 on a background plate B painted in solid black. Then, in a dark room, the present inventors irradiated the diffuser panel DP1 with each of green light, blue light and ultraviolet light from the backside to allow the diffuser panel DP1 to emit light. These green light, blue light and ultraviolet light are believed to be lights to which insect pests such as stink bugs have a relatively high visual sensitivity. The present inventors released stink bugs from a point at a prescribed distance away from the diffuser panel DP1 and examined which of these three color lights the stink bugs were most strongly attracted to.

As a result, it was found that stink bugs were most strongly attracted to an edge formed by the diffuser panel DP1, which was allowed to illuminate by ultraviolet light, and the black background plate B.

Figure 28:
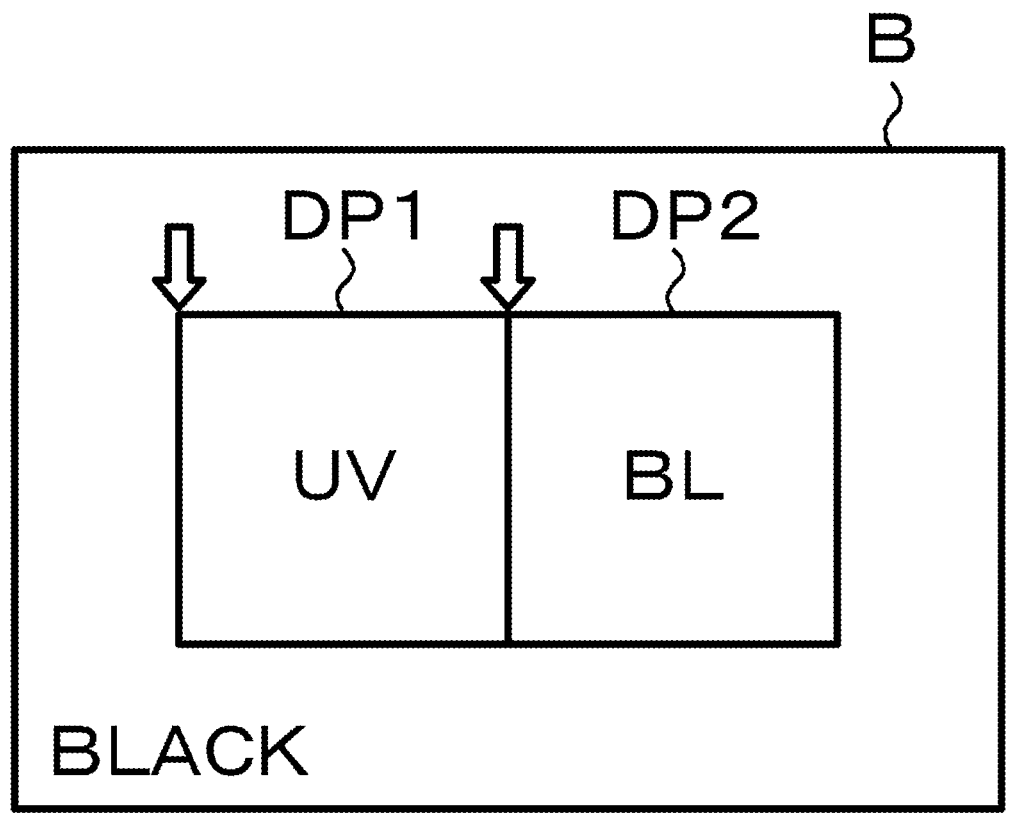
FIG. 28 is a drawing which shows diffuser panels arranged on a background plate.

In view of this, the present inventors compared an edge formed by ultraviolet light and black with an edge formed by lights having colors other than black. Specifically, first, as shown in FIG. 28, the present inventors arranged a diffuser panel DP1 illuminated by ultraviolet light and a diffuser panel DP2 illuminated by blue light on a background plate B, thereby forming, as shown by the arrows in the figure, an edge constituted by the background plate B and the diffuser panel DP1 and an edge constituted by the diffuser panels DP1 and DP2. Then, the present inventors released stink bugs from a point at a prescribed distance away from these diffuser panels DP1 and DP2.

Figure 29:
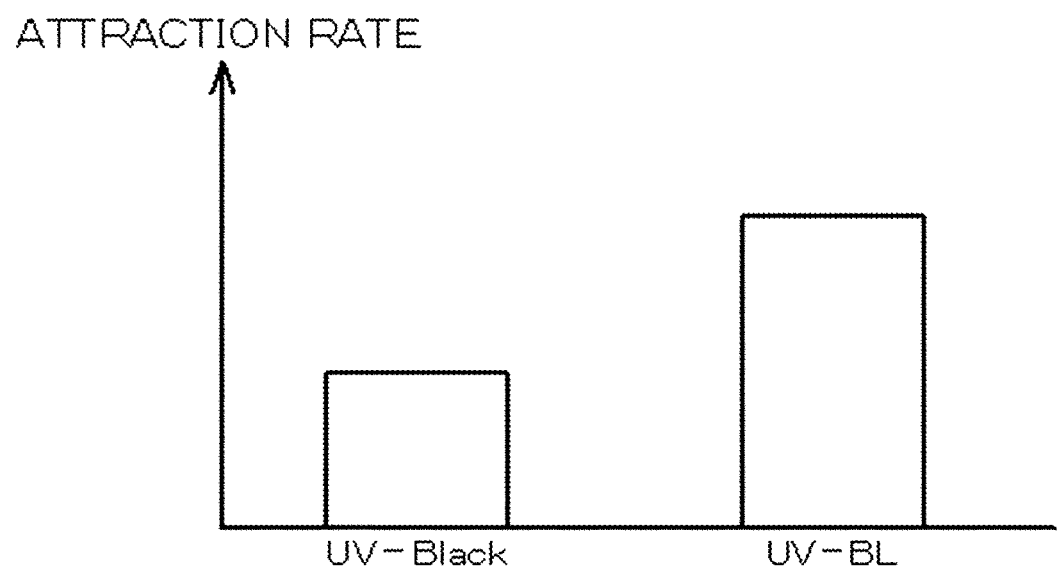
FIG. 29 is a graph for describing the results of comparing edges.

As a result, as shown in the graph of FIG. 29, the attraction rate of the edge (UV-BL) formed by the diffuser panels DP1 and DP2 was found to be higher than that of the edge (UV-Black) formed by the diffuser panel DP1 and the background plate B. It is noted here that these attraction rates were calculated by dividing the number of stink bugs that reached the vicinity of a specific edge by the total number of stink bugs that reached the vicinities of all of the edges.

Figure 30:
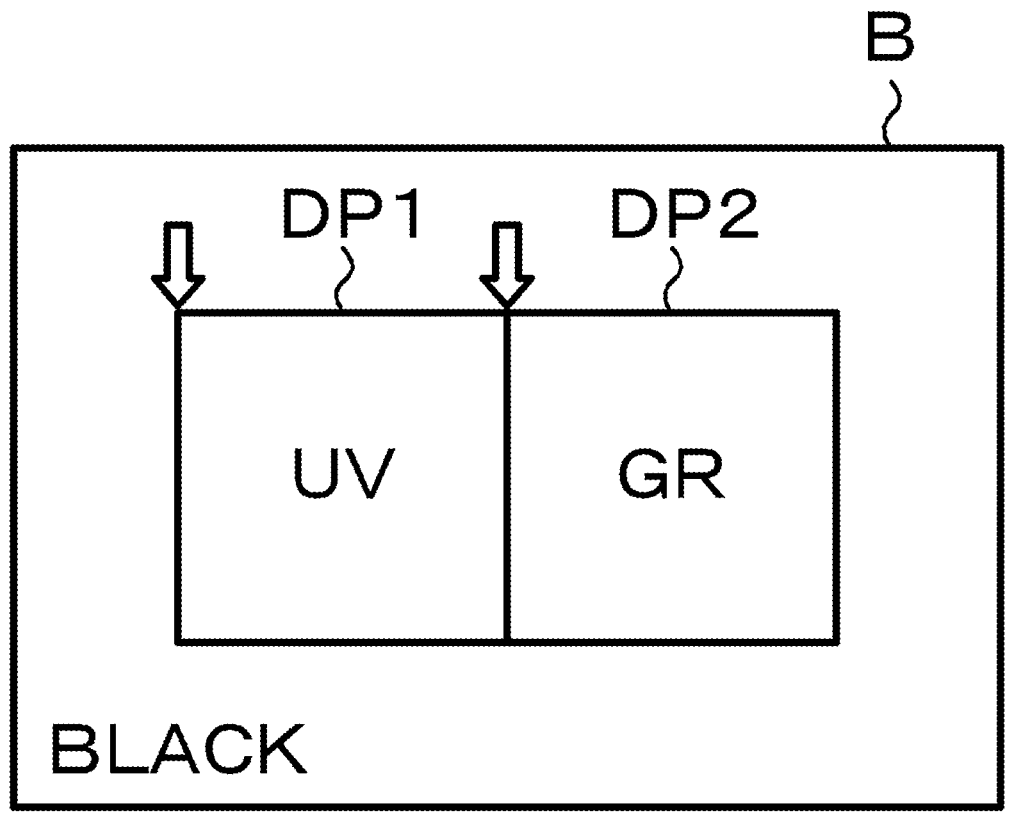
FIG. 30 is a drawing which shows diffuser panels arranged on a background plate.

Next, as shown in FIG. 30, the present inventors arranged the diffuser panel DP1 illuminated by ultraviolet light and the diffuser panel DP2 illuminated by green light on the background plate B, thereby forming, as shown by the arrows in the figure, an edge constituted by the background plate B and the diffuser panel DP1 and an edge constituted by the diffuser panels DP1 and DP2. Then, the present inventors released stink bugs from a point at a prescribed distance away from these diffuser panels DP1 and DP2.

Figure 31:
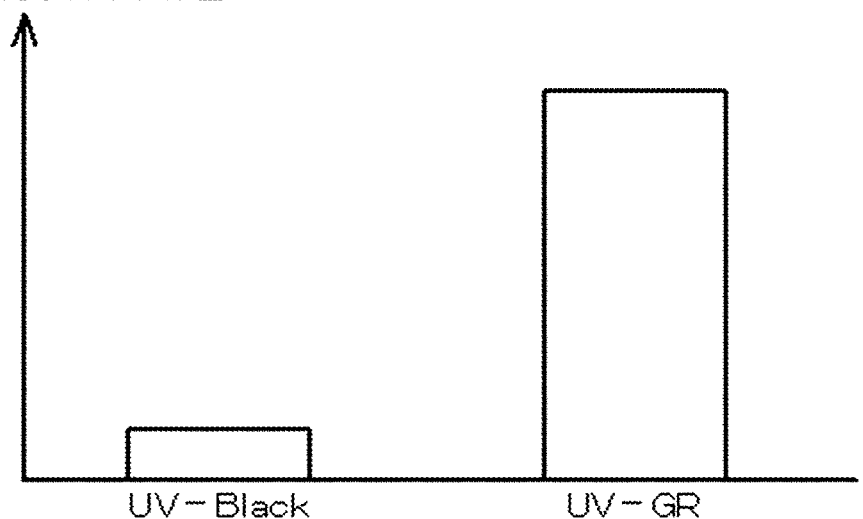
FIG. 31 is a graph for describing the results of comparing edges.

As a result, as shown in the graph of FIG. 31, the attraction rate of the edge (UV-GR) formed by the diffuser panels DP1 and DP2 was found to be higher than that of the edge (UV-Black) formed by the diffuser panel DP1 and the background plate B.

Figure 32:
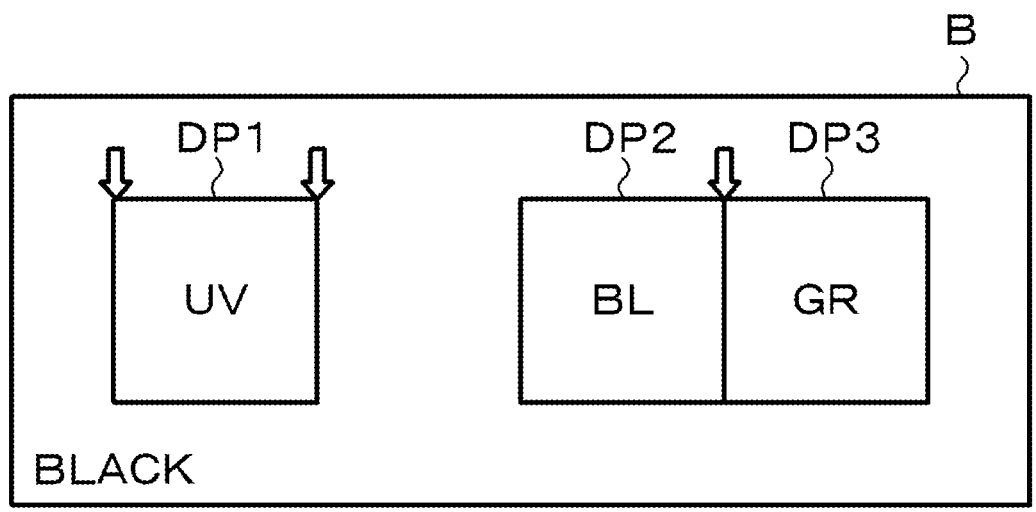
FIG. 32 is a drawing which shows diffuser panels arranged on a background plate.

Next, as shown in FIG. 32, on the background plate B, the present inventors arranged the diffuser panel DP1 illuminated by ultraviolet light, the diffuser panel DP2 illuminated by blue light and a diffuser panel DP3 illuminated by green light, thereby forming, as shown by the arrows in the figure, edges constituted by the background plate B and the diffuser panel DP1 and an edge constituted by the diffuser panels DP2 and DP3. Then, the present inventors released stink bugs from a point at a prescribed distance away from these diffuser panels DP1 to DP3.

Figure 33:
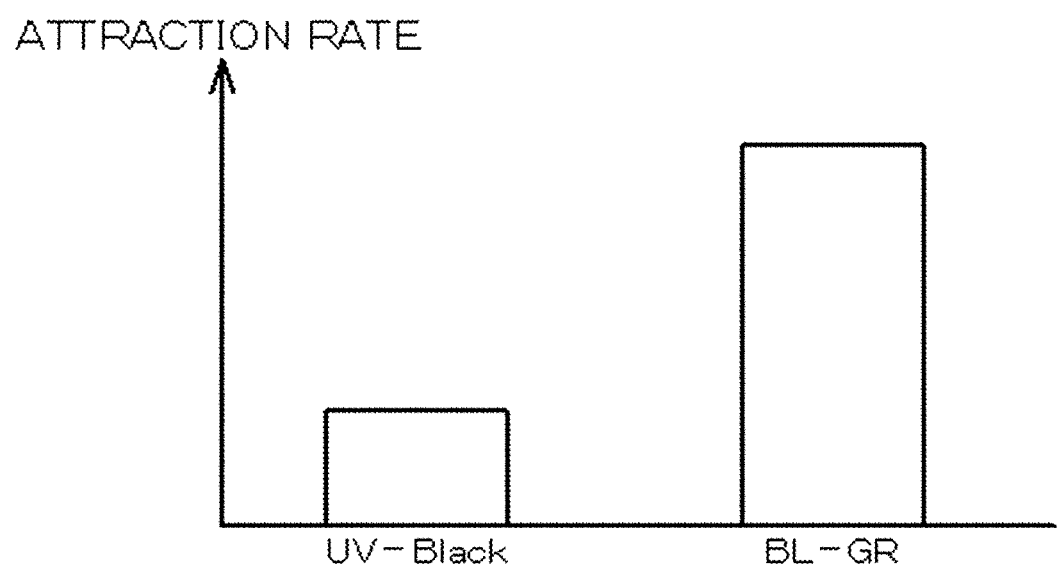
FIG. 33 is a graph for describing the results of comparing edges.

As a result, as shown in the graph of FIG. 33, the attraction rate of the edge (BL-GR) formed by the diffuser panels DP2 and DP3 was found to be higher than that of the edges (UV-Black) formed by the diffuser panel DP1 and the background plate B.

From the above-described results, it is seen that, when an edge formed by ultraviolet light and black and an edge formed by lights having colors other than black are compared, the edge formed by lights having colors other than black shows a higher insect pest attraction rate.

Figure 34:
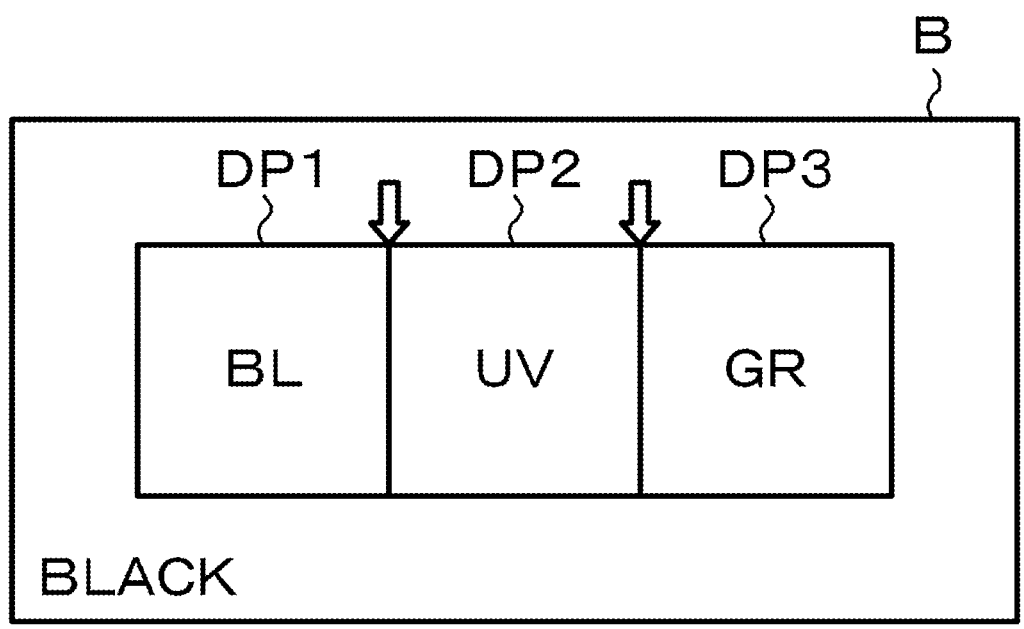
FIG. 34 is a drawing which shows diffuser panels arranged on a background plate.

In view of this, among those edges formed by lights having colors other than black, the present inventors specified the color combination which attains the highest attraction rate. Specifically, first, as shown in FIG. 34, on the background plate B, the present inventors arranged the diffuser panel DP1 illuminated by blue light, the diffuser panel DP2 illuminated by ultraviolet light and the diffuser panel DP3 illuminated by green light, thereby forming, as shown by the arrows in the figure, an edge constituted by the diffuser panels DP1 and DP2 and an edge constituted by the diffuser panels DP2 and DP3. Then, the present inventors released stink bugs from a point at a prescribed distance away from these diffuser panels DP1 to DP3.

Figure 35:
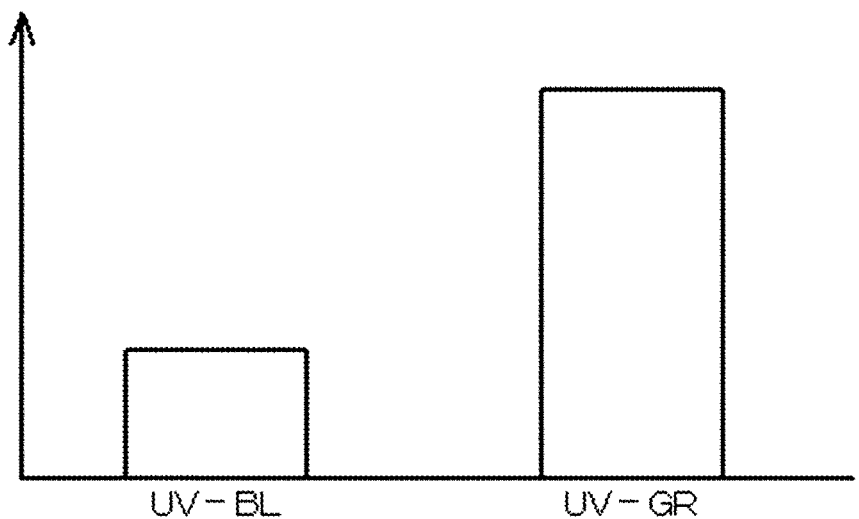
FIG. 35 is a graph for describing the results of comparing edges.

As a result, as shown in the graph of FIG. 35, the attraction rate of the edge (UV-GR) formed by the diffuser panels DP2 and DP3 was found to be higher than that of the edge (UV-BL) formed by the diffuser panels DP1 and DP2.

Figure 36:
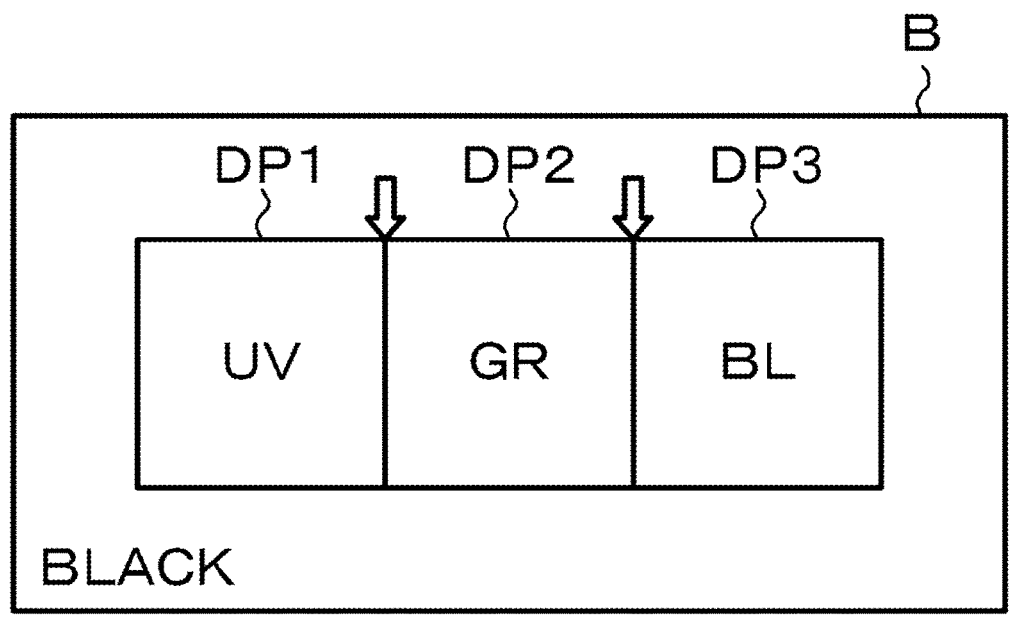
FIG. 36 is a drawing which shows diffuser panels arranged on a background plate.

Next, as shown in FIG. 36, on the background plate B, the present inventors arranged the diffuser panel DP1 illuminated by ultraviolet light, the diffuser panel DP2 illuminated by green light and the diffuser panel DP3 illuminated by blue light, thereby forming, as shown by the arrows in the figure, an edge constituted by the diffuser panels DP1 and DP2 and an edge constituted by the diffuser panels DP2 and DP3. Then, the present inventors released stink bugs from a point at a prescribed distance away from these diffuser panels DP1 to DP3.

Figure 37:
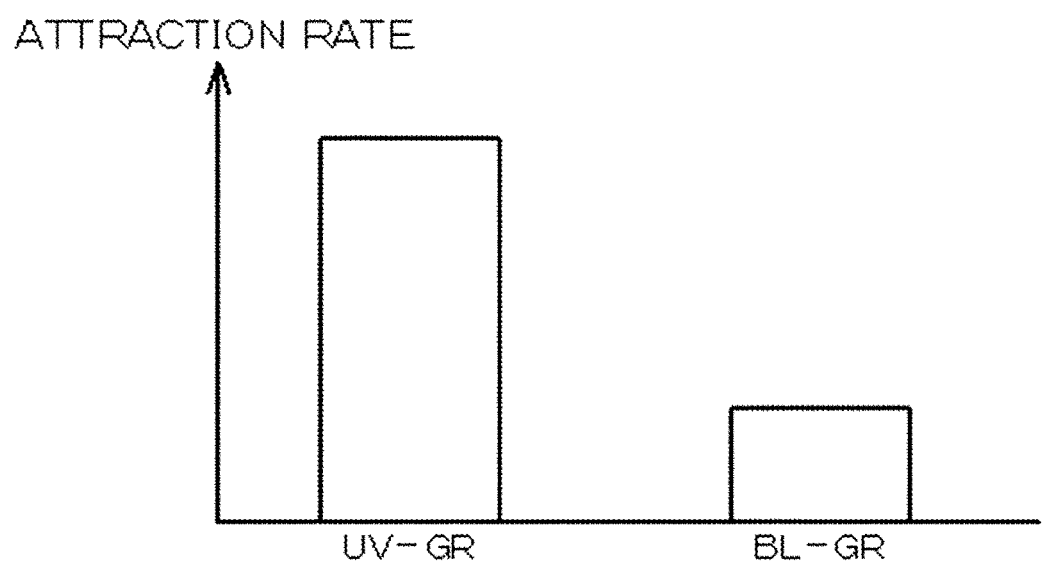
FIG. 37 is a graph for describing the results of comparing edges.

As a result, as shown in the graph of FIG. 37, the attraction rate of the edge (UV-GR) which was formed by the diffuser panel DP1 illuminated by ultraviolet light and the diffuser panel DP2 illuminated by green light was found to be higher than that of the edge (BL-GR) which was formed by the diffuser panel DP2 illuminated by green light and the diffuser panel DP3 illuminated by blue light.

Figure 38:
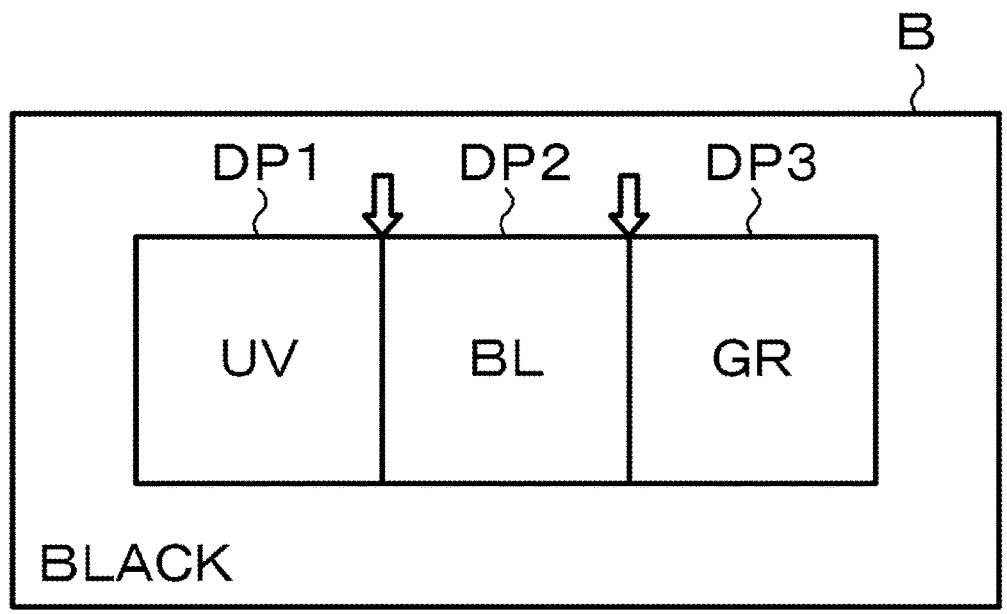
FIG. 38 is a drawing which shows diffuser panels arranged on a background plate.

Next, as shown in FIG. 38, on the background plate B, the present inventors arranged the diffuser panel DP1 illuminated by ultraviolet light, the diffuser panel DP2 illuminated by blue light and the diffuser panel DP3 illuminated by green light, thereby forming, as shown by the arrows in the figure, an edge constituted by the diffuser panels DP1 and DP2 and an edge constituted by the diffuser panels DP2 and DP3. Then, the present inventors released stink bugs from a point at a prescribed distance away from these diffuser panels DP1 to DP3.

Figure 39:
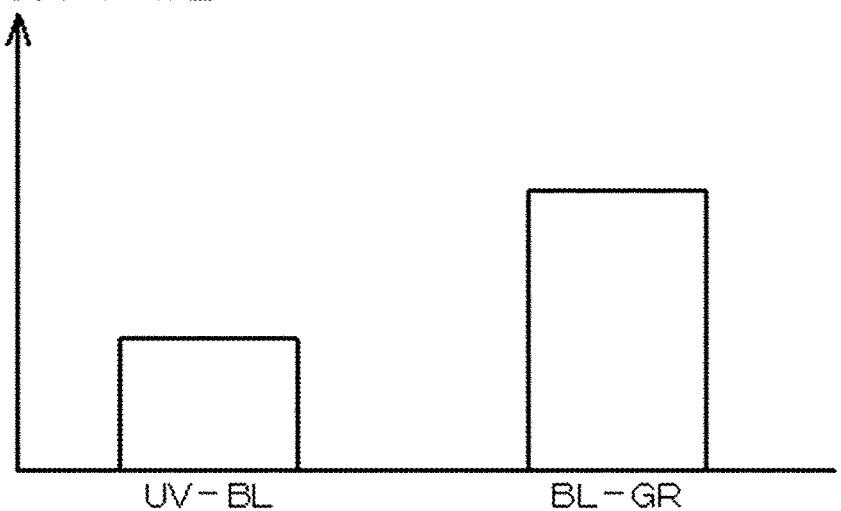
FIG. 39 is a graph for describing the results of comparing edges.

As a result, as shown in the graph of FIG. 39, the attraction rate of the edge (BL-GR) which was formed by the diffuser panel DP2 illuminated by blue light and the diffuser panel DP3 illuminated by green light was found to be higher than that of the edge (UV-BL) which was formed by the diffuser panel DP1 illuminated by ultraviolet light and the diffuser panel DP2 illuminated by blue light.

From the above-described results, it is seen that, when an edge formed by blue light and ultraviolet light, an edge formed by ultraviolet light and green light and an edge formed by green light and blue light are compared, the edge formed by ultraviolet light and green light has the highest attraction rate and the edge formed by ultraviolet light and blue light has the lowest attraction rate.

Figure 40:
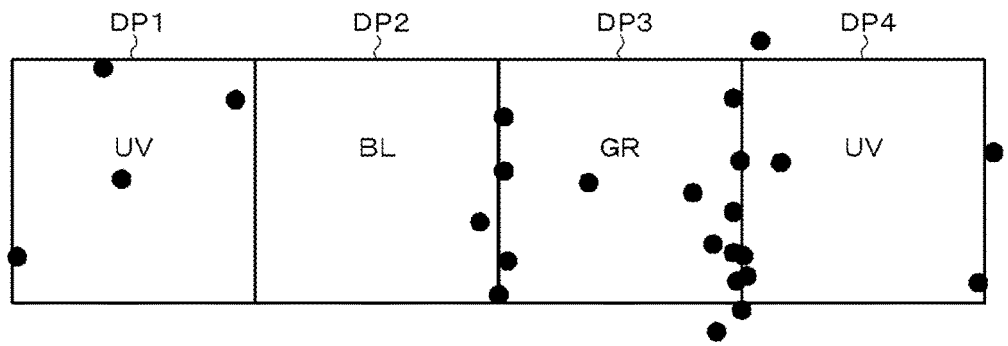
FIG. 40 is a drawing for describing the results of comparing edges.

FIG. 40 is a drawing which shows a condition in which the diffuser panel DP1 illuminated by ultraviolet light, the diffuser panel DP2 illuminated by blue light, the diffuser panel DP3 illuminated by green light and a diffuser panel DP4 illuminated by ultraviolet light are arranged in this sequential order. In FIG. 40, the filled circles represent the destination points of stink bugs that were released to these diffuser panels DP1 to DP4. It is apparent also from the results shown in FIG. 40 that the edge formed by the diffuser panel DP3 illuminated by green light and a diffuser panel DP4 illuminated by ultraviolet light, that is, the edge formed by ultraviolet light and green light, has a high attraction rate.

Figure 41:
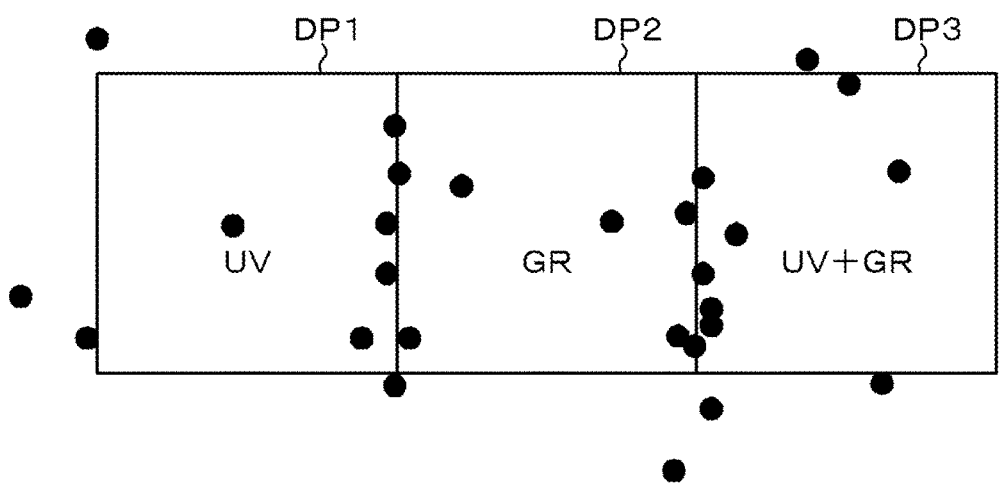
FIG. 41 is a drawing for describing the results of comparing edges.

In view of this, the present inventors examined the attraction rate of an edge formed by a color-mixed light of ultraviolet light and green light and a light of other color. Specifically, as shown in FIG. 41, the present inventors arranged the diffuser panel DP1 illuminated by ultraviolet light, the diffuser panel DP2 illuminated by green light and the diffuser panel DP3 illuminated by color-mixed light of ultraviolet light and green light in this sequential order. Then, the present inventors released stink bugs to these diffuser panels DP1 to DP3. As shown by the filled circles in FIG. 41, the stink bugs were most strongly attracted to the edge formed by the diffuse panel DP2 illuminated by green light and the diffuser panel DP3 illuminated by color-mixed light.

Figure 42:
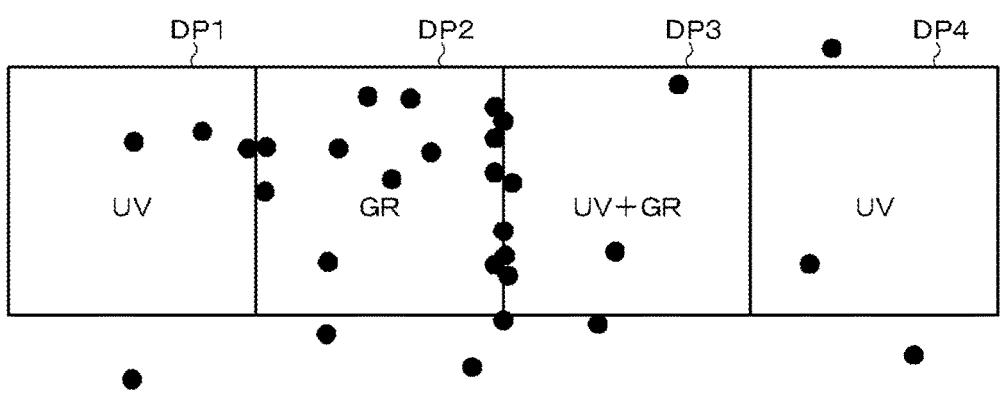
FIG. 42 is a drawing for describing the results of comparing edges.

In the same manner, as shown in FIG. 42, the present inventors arranged the diffuser panel DP1 illuminated by ultraviolet light, the diffuser panel DP2 illuminated by green light, the diffuser panel DP3 illuminated by color-mixed light of ultraviolet light and green light and the diffuser panel DP4 illuminated by ultraviolet light in this sequential order. Then, the present inventors released stink bugs to these diffuser panels DP1 to DP4. As shown by the filled circles in FIG. 42, the stink bugs were most strongly attracted to the edge formed by the diffuse panel DP2 illuminated by green light and the diffuser panel DP3 illuminated by color-mixed light.

From the above-described results, it is seen that insect pests such as stink bugs are strongly attracted to an edge formed by green light and color-mixed light of ultraviolet light and green light. In the attraction device 11 according to this embodiment, green light diffuses from the plate 131 and ultraviolet light and green light diffuse from the plate 132. This results in the formation of a contrast by the green light and the color-mixed light of ultraviolet light and green light. Therefore, the attraction device 11 can effectively attract insect pests.

In the above-described embodiment, a case where a contrast is formed by green light and color-mixed light of ultraviolet light and green light was described. However, a contrast may also be formed by, for example, blue light and color-mixed light of ultraviolet light and green light. In this case as well, the attraction device 11 can effectively attract insect pests.

In this case, it is considered to use, for example, blue light-emitting LEDs as the LEDs constituting the LED unit 121A.

So far, the embodiments of the present disclosure were described; however, the present disclosure is not restricted thereto. For example, by providing insect-capturing means such as an adhesive tape on the upper surfaces of the plates 31 and 32 of the attraction device 10 according to the above-described embodiment or on the upper surfaces of the plates 131 and 132 of the attraction device 11 according to the above-described embodiment, an insect-capturing apparatus for capturing insect pests can be realized. In this case, the +X side surfaces of the attraction devices 10 and 11 shown in FIGS. 1 and 25, respectively, function as surfaces for capturing insect pests. In the embodiments of the present disclosure, insect pests can be effectively captured since the contrast formed by the plates 31 and 32 or the contrast formed by the plates 131 and 132 is positioned in the center of the insect-capturing surface.

Alternatively, an insect-capturing apparatus comprising the attraction device 10 or 11 can also be realized by arranging insecticidal means and/or capturing means around the attraction device 10 or 11.

Figure 43:
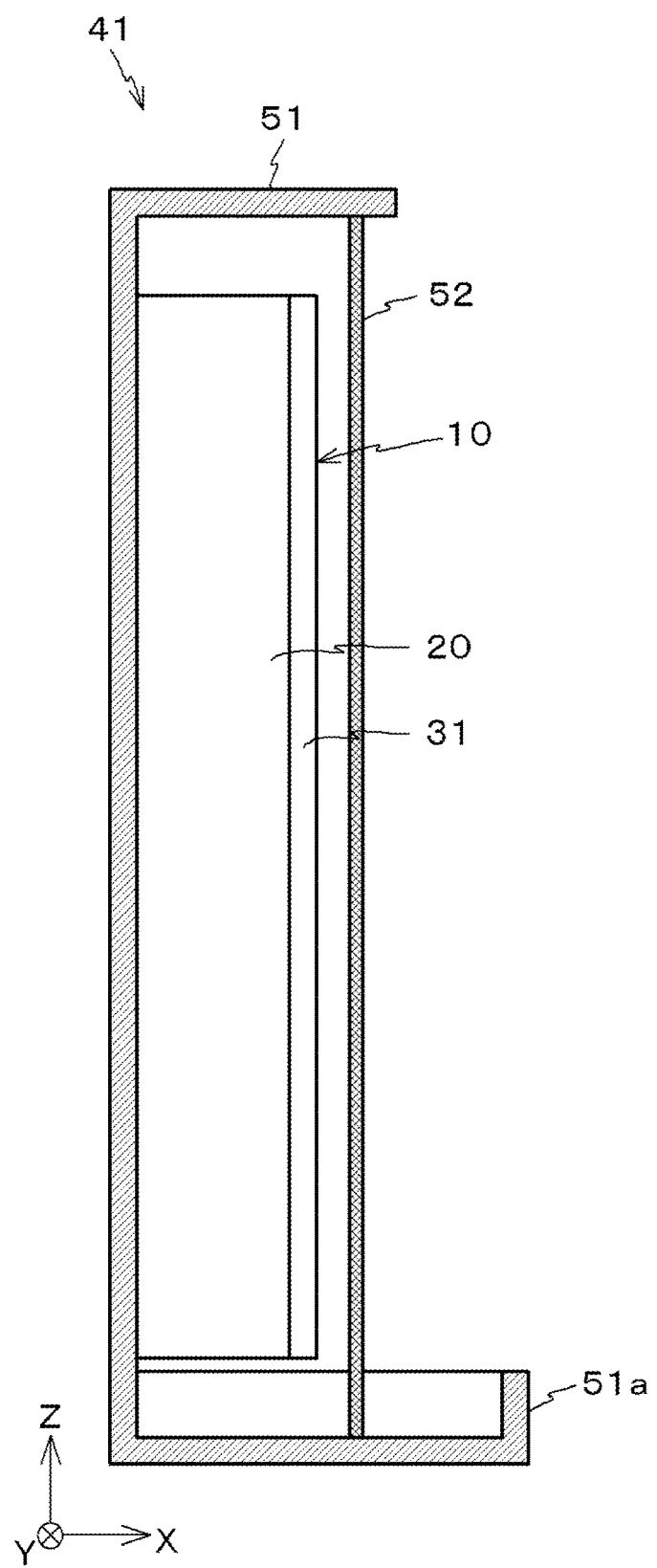
FIG. 43 is a drawing showing an example of insect-capturing apparatus.

For example, FIG. 43 shows an insect-capturing apparatus 41 which comprises an electric shock grid 52 as the insecticidal means. As shown in FIG. 43, the insect-capturing apparatus 41 comprises the attraction device 10, a casing 51 which houses the attraction device 10, and the electric shock grid 52 supported in the front side (+X side) of the plates 31 and 32 constituting the attraction device 10.

In this insect-capturing apparatus 41, insect pests that are attracted to the attraction device 10 come into contact with the electric shock grid 52 to be killed or injured by an electric shock. Then, the insect pests fall into a collector 51a provided on the casing 51. In this manner, insect pests are captured by the insect-capturing apparatus 41.

Figure 44:
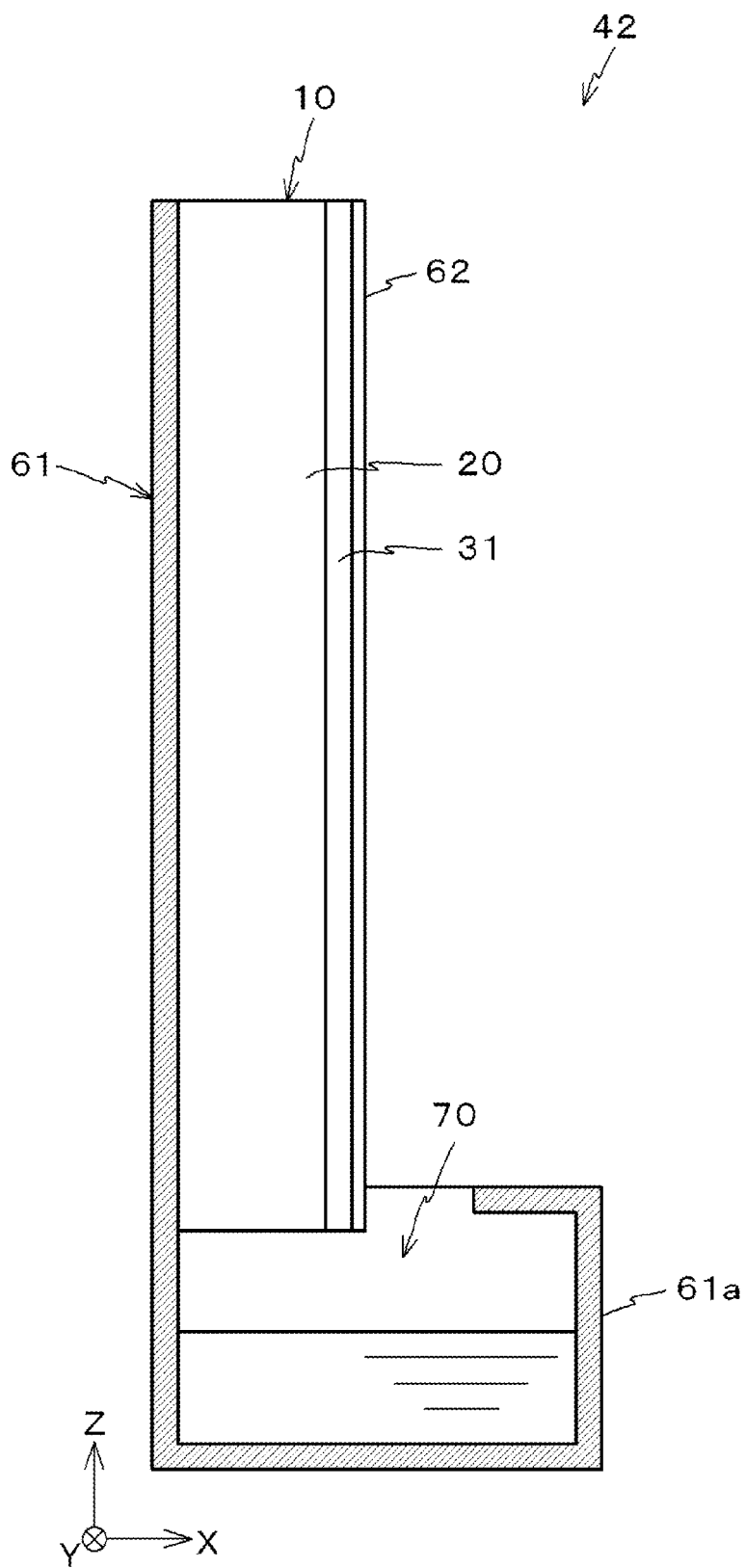
FIG. 44 is a drawing showing an example of insect-capturing apparatus.

Further, FIG. 44 shows an insect-capturing apparatus 42 which comprises a water reservoir 61a as the capturing means. As shown in FIG. 44, the insect-capturing apparatus 42 comprises the attraction device 10 and a casing 61 which houses the attraction device 10. Further, on the surfaces of the plates 31 and 32 constituting the attraction device 10, an insect-sliding sheet 62 having a relatively small coefficient of friction is pasted.

In this insect-capturing apparatus 42, although insect pests that are attracted to the attraction device 10 try to stay on the insect-sliding sheet 62 pasted on the plates 31 and 32 of the attraction device 10, they keep sliding down along the surface of the insect-sliding sheet 62. Then, the insect pests fall down to the water reservoir 61a formed in the casing 61. The insect pests falling to the water reservoir 61a are submerged into water 70 stored in the water reservoir 61a, making it almost impossible for the insect pests to escape outside. In this manner, insect pests are captured by the insect-capturing apparatus 42.

So far, the insect-capturing apparatus 41 which comprises the electric shock grid 52 as insecticidal means and the insect-capturing apparatus 42 which comprises the water reservoir 61a as capturing means were described; however, an insect-capturing apparatus may also comprise both insecticidal means and capturing means.

In the above-described first embodiment, the plate 31 primarily transmits, for example, light having a wavelength of about 370 nm, and the plate 32 primarily transmits, for example, light having a wavelength of about 520 nm. However, without being restricted thereto, although the attraction effect is reduced, the plates 31 and 32 may have different colors as long as an edge is formed on the boundary therebetween.

In the above-described first embodiment, a case where the plate 31 transmits light having a wavelength of about 370 nm and the plate 32 transmits light having a wavelength of about 520 nm. However, without being restricted thereto, a member which spontaneously emits light having a wavelength of about 370 nm may be used in place of the plate 31 and a member which spontaneously emits light having a wavelength of about 520 nm may be used in place of the plate 32.

The attraction device 10 is preferably used, for example, as shown in FIG. 1, in such a posture that the edge formed by the plates 31 and 32 is parallel to the vertical axis (Z-axis). However, the posture of the arrangement of the attraction device 10 is not particularly restricted and the attraction device 10 can also be used by, for example, arranging it on a floor surface or the like, with the plates 31 and 32 being positioned as top surface.

In the above-described first embodiment, a case where the attraction device 10 comprises the LED unit 21 as a light source was explained. Without being restricted thereto, however, the attraction device 10 does not have to comprise a light source such as the LED unit 21. In this case, it is considered to use, as the plates 31 and 32, a material which shows a high reflectance for, for example, light having a wavelength of about 370 nm, and a material which shows a high reflectance for, for example, light having a wavelength of about 520 nm, respectively.

In the above-described second embodiment, a case where the attraction device 11 comprises the LED units 121A and 121B as light sources was explained. Without being restricted thereto, however, the attraction device 11 does not have to comprise a light source such as the LED unit 121A or 121B. In this case, it is considered to use, as the plates 131 and 132, a material which shows a high reflectance for, for example, light having a wavelength of about 520 nm, and a material which shows a high reflectance for, for example, light having a wavelength of about 520 nm and light having a wavelength of about 370 nm, respectively.

Figure 45:
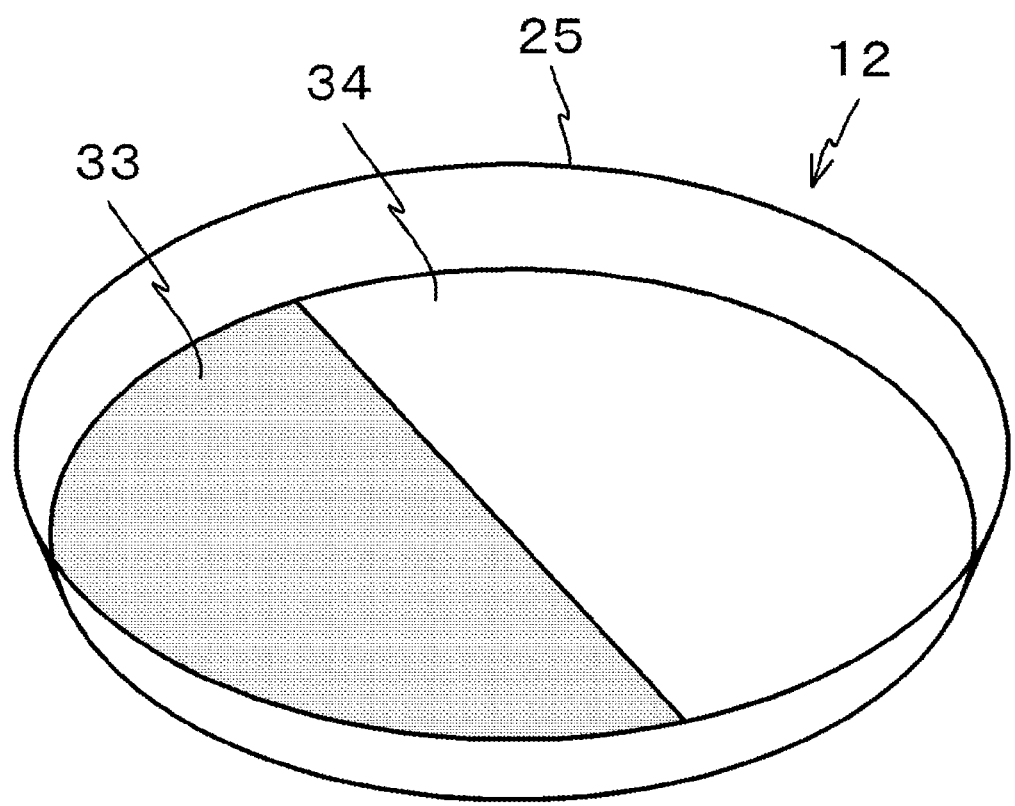
FIG. 45 is a drawing showing an attraction device according to a modification example.

For example, FIG. 45 is a drawing showing an attraction device 12 according to a modification example. This attraction device 12 comprises a container 25 having a circular bottom and semicircular sheets 33 and 34 which are pasted on the bottom of the container 25 and have different colors from each other. By this, two regions of different colors are formed on the bottom of the container 25 and an edge is formed on the boundary of these regions. As for the sheets 33 and 34, it is preferred that either one have a high reflectance for, for example, light having a wavelength of about 370 nm and the other have a high reflectance for, for example, light having a wavelength of about 520 nm. The above-described attraction device 12 can be used with the container 25 being filled with water or an insecticidal liquid.

In the above-described embodiments, an edge is formed by using two colored lights such as lights transmitting through the plates 31 and 32 or lights transmitting through the plates 131 and 132. Without being restricted thereto, however, an edge may also be formed by using two kinds of lights having different polarization directions.

Figure 46:
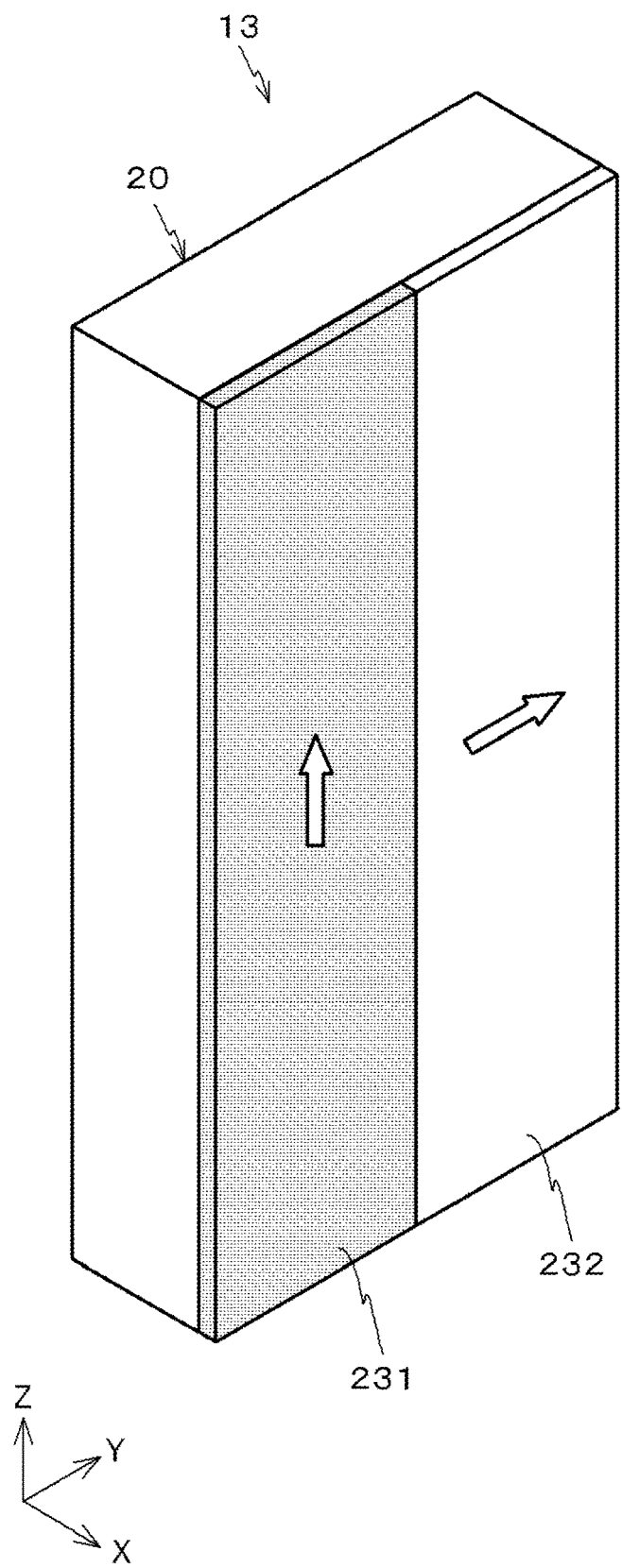
FIG. 46 is a drawing showing an attraction device according to another modification example.

For example, in FIG. 46, an attraction device 13 according to another modification example is shown. This attraction device 13 comprises a polarizing plate 231 in place of the plate 31 and a polarizing plate 232 in place of the plate 32.

The polarizing plate 231 emits light, which is emitted from the LED unit housed in the chassis 20 and enters the polarizing plate 231, to the outside as vertically-polarized light whose oscillation direction is the vertical direction. Further, the polarizing plate 232 emits light, which is emitted from the LED unit housed in the chassis 20 and enters the polarizing plate 232, to the outside as horizontally-polarized light whose oscillation direction is the horizontal direction. This results in the appearance of an edge formed by the vertically-polarized light and the horizontally-polarized light on the boundary between the polarizing plates 231 and 232. By this, insect pests such as stink bugs can be effectively attracted. The reason therefor will now be described below.

Figure 47:
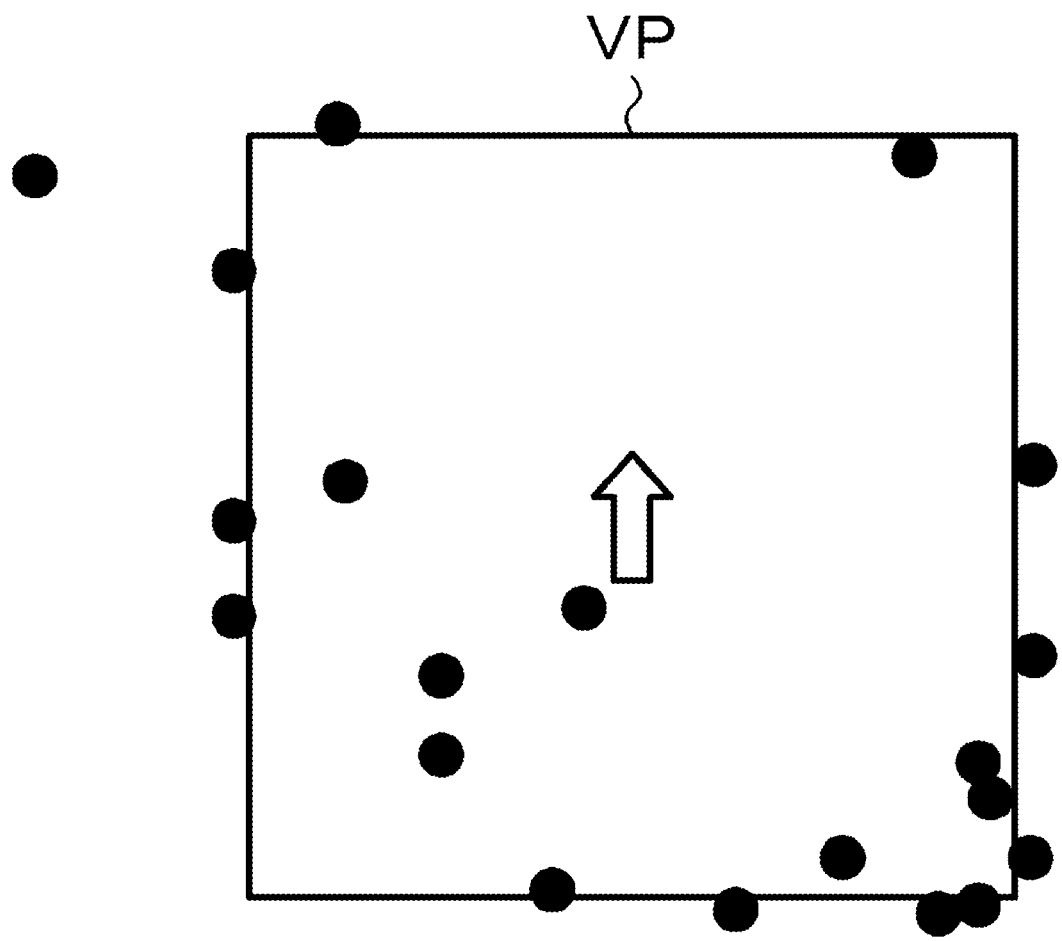
FIG. 47 is a drawing showing a polarizing plate which emits vertically-polarized light.
Figure 48:
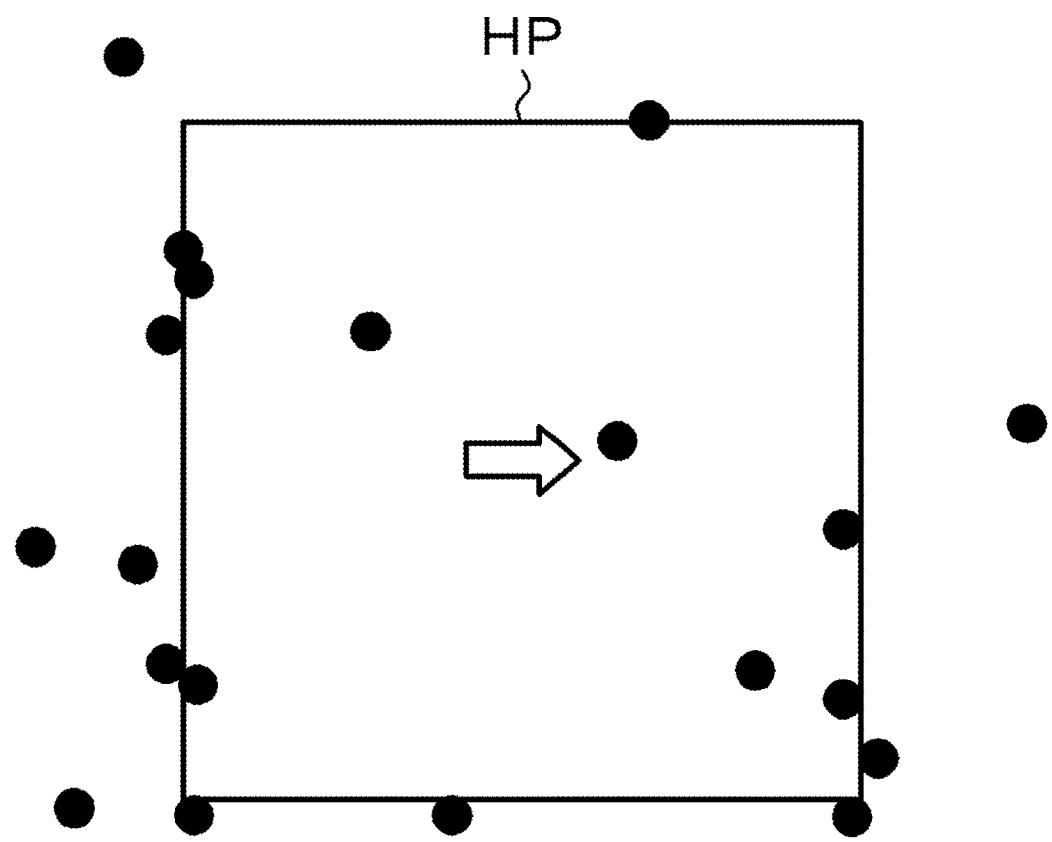
FIG. 48 is a drawing showing a polarizing plate which emits horizontally-polarized light.

FIG. 47 is a drawing showing a polarizing plate VP which emits vertically-polarized light. Further, FIG. 48 is a drawing showing a polarizing plate HP which emits horizontally-polarized light. To each of the polarizing plates VP and HP, the present inventors released stink bugs from a point at a prescribed distance away from the respective polarizing plates VP and HP. In this case, as shown by the filled circles in FIGS. 47 and 48, the stink bugs were primarily attracted to the peripheries of the polarizing plates VP and HP.

Figure 49:
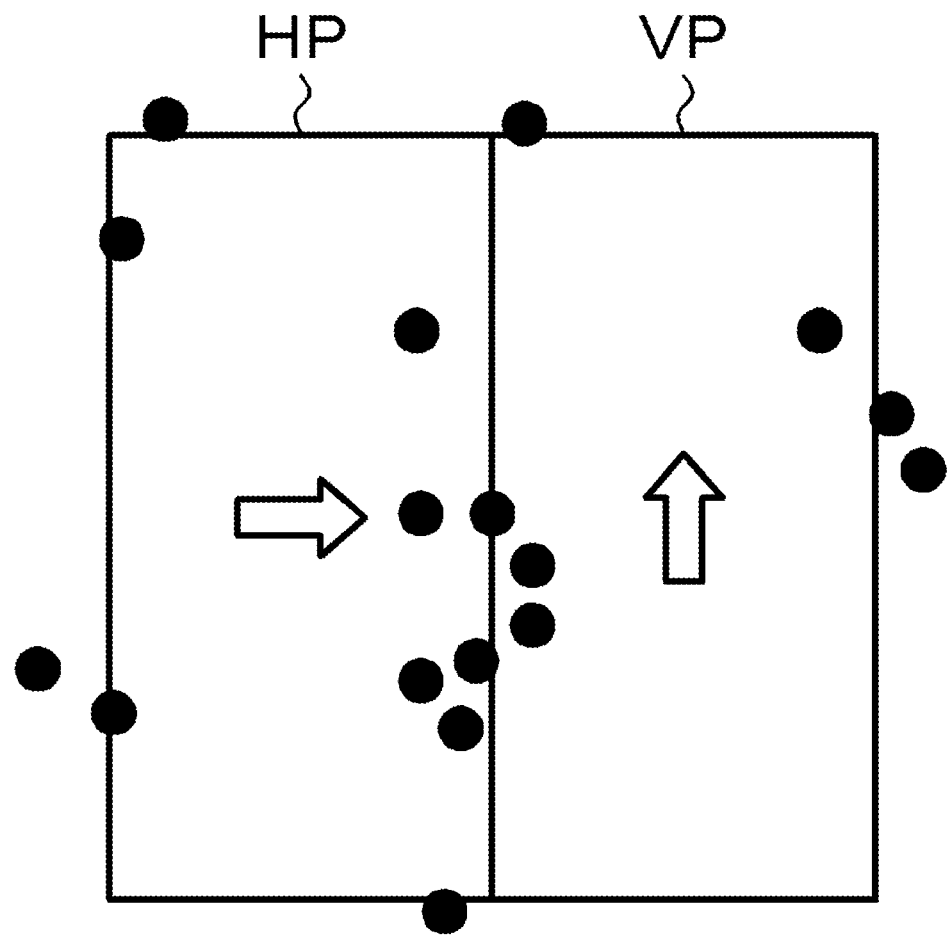
FIG. 49 is a drawing which shows an edge formed in the vertical direction by the vertically-polarized light and the horizontally-polarized light.

FIG. 49 shows the polarizing plates HP and VP that are arranged adjacent to each other in the horizontal direction. Horizontally-polarized light is emitted from the polarizing plate HP and vertically-polarized light is emitted from the polarizing plate VP. Consequently, on the boundary between these polarizing plates HP and VP, an edge whose longitudinal direction is the vertical direction is formed. To each of the polarizing plates HP and VP, the present inventors released stink bugs from a point at a prescribed distance away from the respective polarizing plates HP and VP. In this case, as shown by the filled circles in FIG. 49, the stink bugs were strongly attracted to the boundary between the polarizing plates VP and HP.

Figure 50:
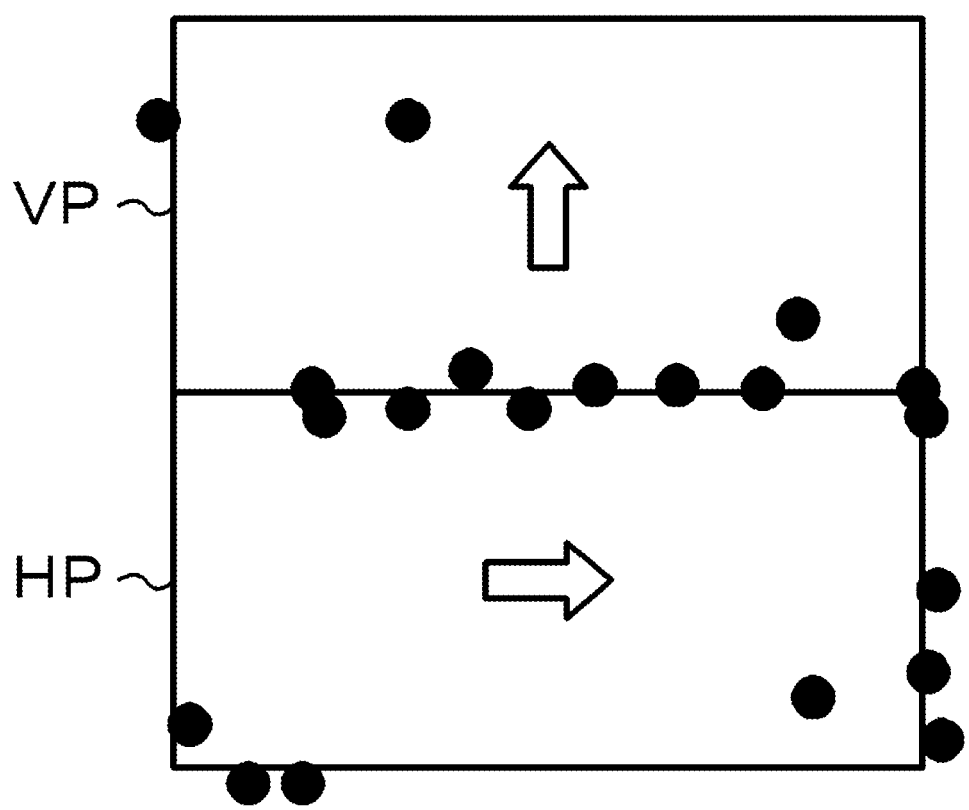
FIG. 50 is a drawing which shows an edge formed in the horizontal direction by the vertically-polarized light and the horizontally-polarized light.

Further, FIG. 50 shows polarizing plates VP and HP that are arranged adjacent to each other in the vertical direction. Vertically-polarized light is emitted from the polarizing plate VP and horizontally-polarized light is emitted from the polarizing plate HP. Consequently, on the boundary between these polarizing plates VP and HP, an edge whose longitudinal direction is the horizontal direction is formed. To each of the polarizing plates VP and HP, the present inventors released stink bugs from a point at a prescribed distance away from the respective polarizing plates VP and HP. In this case, as shown by the filled circles in FIG. 50, the stink bugs were strongly attracted to the boundary between the polarizing plates VP and HP. From the above-described results, it is seen that stink bugs are strongly attracted to an edge formed by vertically-polarized light and horizontally-polarized light.

In the attraction device 13 according to this modification example, an edge is formed on the boundary between the polarizing plates 231 and 232 by vertically-polarized light emitted from the polarizing plate 231 and horizontally-polarized light emitted from the polarizing plate 232. Therefore, the attraction device 13 can effectively attract insect pests such as stink bugs.

Further, in the attraction device 13 according to this modification example, there is no restriction on the color of the LED or the like to be used as the light source. Therefore, an inexpensive lighting equipment such as a fluorescent lamp can be used as the light source. By this, the cost of the device can be reduced.

In the above-described embodiments, an LED was used as the light source; however, the light source is not restricted thereto and natural light or other light source may be used as well.

It should be noted here that various embodiments and modifications may be applied to the present disclosure without departing from its broad spirit and scope. Further-more, the above-described embodiments are intended to illustrate the present disclosure, not to limit its scope.

The present application is based on Japanese Patent Application Nos. 2011-205132 and 2012-49842, which were filed on Sep. 20, 2011 and Mar. 6, 2012, respectively. The specifications, claims and drawings of Japanese Patent Application Nos. 2011-205132 and 2012-49842 are hereby incorporated by reference in their entirety.

INDUSTRIAL APPLICABILITY

The attraction device according to the present disclosure is suitable for attracting insects. Further, the insect-capturing apparatus according to the present disclosure is suitable for capturing insects.

REFERENCE SIGNS LIST 10 to 13 Attraction device
20, 120 Chassis
20a, 120a Base plate
20b, 120b Frame
21, 121A, 121B LED unit
22, 122 Printed wiring board
23, 123a, 123b LED
25 Container
31, 32, 131, 132 Plate
33, 34 Sheet
41, 42 Insect-capturing apparatus
51 Casing
51a Collector
52 Electric shock grid
61 Casing
61a Water reservoir
62 Insect-sliding sheet
70 Water
100 Verification apparatus
101 Frame
101a Light-transmitting section
101b Body
102 Base plate
120c Inner wall
231, 232 Polarizing plate
B Background plate
DP1 Diffuser panel
DP1 to DP4 Diffuser panel
HP, VP Polarizing plate
LM Landmark
P1 to P5 LED panel
S1, S2, S3, S4, S5 Point
T1 to T10 Object
U1, U2 Unit

The invention claimed is:

1. An attraction device, comprising: an attractor comprising two surfaces that comprises:
a first surface exhibiting a color of light comprising a larger amount of light in an ultraviolet region than an amount of light in regions other than the ultraviolet region; and
a second surface exhibiting a color of light comprising light in a green region, the second surface being adjacent to the first surface, wherein:
a unidirectional edge of a contrast by the color of the light comprising the light in the ultraviolet region and the color of the light comprising the light in the green region is formed between the first and second surface,
only the second surface exhibits, in the vicinity of the first surface, a color of light equivalent to the color of light exhibited by the second surface,
only the first surface exhibits, in the vicinity of the second surface, a color of light equivalent to the color of light exhibited by the first surface; and
the edge is parallel to the longitudinal directions of the first and second surfaces.

2. The attraction device according to claim 1, wherein the attractor comprises:
a first member having the first surface that reflects the light of the ultraviolet region; and
a second member having the second surface that reflects the light of the green region and is arranged adjacent to the first member.

3. The attraction device according to claim 2, comprising a light source that irradiates the first member and the second member with light.

4. The attraction device according to claim 1, wherein the shape of the edge is a smooth continuous line.

5. The attraction device according to claim 1, wherein the length of the edge is at least 26 mm.

6. The attraction device according to claim 1, further comprising a light source for emitting light to the first and second surfaces, the light source being arranged behind the first and second surfaces, wherein the attractor leads light irradiated by the light source only through the first and second surfaces to outside.

7. The attraction device according to claim 1, wherein the light comprising the light in the ultraviolet region and the light comprising the light in the green region respectively diffuse from the first and second surfaces.

8. The attraction device according to claim 1, wherein,
the first surface emits light comprising a larger amount of light in the ultraviolet region than an amount of light in regions other than the ultraviolet region,
the second surface emits light comprising light in the green region, and
the edge is formed to run from one end to the other end of the first surface and the second surface emitting the light.

9. The attraction device according to claim 1, wherein the first surface exhibits only a color of light in the ultraviolet region.

10. The attraction device according to claim 1, wherein,
the first surface emits light containing a larger amount of light in the ultraviolet region than an amount of light in the other region different from the ultraviolet region,
the second surface emits light comprising light in the green region, and
the attraction device comprises only one edge formed by the first surface and the second surface emitting the light.

11. An attraction device comprising: an attractor that comprises:
a first member transmitting light that comprising a larger amount of light having a wavelength in an ultraviolet region than an amount of light having a wavelength in regions other than the ultraviolet region; and
a second member transmitting light comprising light having a wavelength in a green region, the second surface being arranged adjacent to the first surface, wherein:

a unidirectional edge of a contrast by a color of the light comprising the light in the ultraviolet region and a color of the light comprising the light in the green region is formed between the first and second members, only the second member transmits, in the vicinity of the first member, light of a color equivalent to the color of light transmitted by the second member, and only the first member transmits, in the vicinity of the second surface, light of a color equivalent to the color of light transmitted by the first member.

12. The attraction device according to claim 11, wherein the first member is configured to have light penetrate through the first member, the light being of the ultraviolet region and of the green region.

13. The attraction device according to claim 11, wherein the first member is configured to have light penetrate through the first member, the light being of the ultraviolet region and of a wavelength region different from the ultraviolet region.

14. The attraction device according to claim 11, comprising a light source behind the first and second members, the light source being used for irradiating the first and second members with light.

15. An attraction device, comprising: an attractor that comprises:
   a first member that reflects a larger amount of light having a wavelength in an ultraviolet region than an amount of light having a wavelength in regions other than the ultraviolet region; and
   a second member that reflects light having a wavelength in a green region, the second member being arranged adjacent to the first member, wherein
   a unidirectional edge of a contrast by a color of the light comprising the light in the ultraviolet region and a color of the light comprising the light in the green region is formed between the first and second members,
   only the second member reflects, in the vicinity of the first member, light of a color equivalent to the color of light reflected by the second member,
   only the first member reflects, in the vicinity of the second member, light of a color equivalent to the color of light reflected by the first member, and,
   the first member reflects the light of the green region in addition to the light of the ultraviolet region.

16. An attraction device, comprising: an attractor that comprises:
   a first member that reflects a larger amount of light having a wavelength in an ultraviolet region than an amount of light having a wavelength in regions other than the ultraviolet region; and
   a second member that reflects light having a wavelength in a green region, the second member being arranged adjacent to the first member, wherein
   a unidirectional edge of a contrast by a color of the light comprising the light in the ultraviolet region and a color of the light comprising the light in the green region is formed between the first and second members,
   only the second member reflects, in the vicinity of the first member, light of a color equivalent to the color of light reflected by the second member,
   only the first member reflects, in the vicinity of the second member, light of a color equivalent to the color of light reflected by the first member, and
   the first member reflects light of a wavelength region different from ultraviolet region in addition to the light of the ultraviolet region.

17. An attraction device, comprising: an attractor that comprises:
   a first member that emits a larger amount of light having a wavelength in an ultraviolet region than an amount of light having a wavelength in regions other than the ultraviolet region; and
   a second member that emits light having a wavelength in a green region, the second member being arranged adjacent to the first member, wherein
   a unidirectional edge of a contrast by a color of the light comprising the light in the ultraviolet region and a color of the light comprising the light in the green region is formed between the first and second members,
   only the second member emits, in the vicinity of the first member, light of a color equivalent to the color of light emitted by the second member,
   only the first member emits, in the vicinity of the second member, light of a color equivalent to the color of light emitted by the first member, and
   the first member that emits the light of the ultraviolet region and the light of the green region.

18. An attraction device comprising: an attractor that comprises:
   a first member that emits a larger amount of light having a wavelength in an ultraviolet region than an amount of light having a wavelength in regions other than the ultraviolet region; and
   a second member that emits light having a wavelength in a green region, the second member being arranged adjacent to the first member, wherein
   a unidirectional edge of a contrast by a color of the light comprising the light in the ultraviolet region and a color of the light comprising the light in the green region is formed between the first and second members,
   only the second member emits, in the vicinity of the first member, light of a color equivalent to the color of light emitted by the second surface,
   only the first member emits, in the vicinity of the second member, light of a color equivalent to the color of light emitted by the first member, and
   the first member emits the light of the ultraviolet region and light of a wavelength region different from the ultraviolet region.

19. An attraction device, comprising an attractor comprising two surfaces that comprise:
   a first surface exhibiting a color of light comprising a larger amount of light in an ultraviolet region than an amount of light in regions other than the ultraviolet region; and
   a second surface exhibiting a color of light comprising light in a green region, the second surface being adjacent to the first surface,
   a unidirectional edge of a contrast by the color of the light comprising the light in the ultraviolet region and the color of the light comprising the light in the green region is formed between the first and second surfaces,
   only the second surface exhibits, in the vicinity of the first surface, a color of light equivalent to the color of light exhibited by the second surface,
   only the first surface exhibits, in the vicinity of the second surface, a color of light equivalent to the color of light exhibited by the first surface,
and
   the attractor comprises:

first and second diffuser panels that diffuse incoming light, the first diffuser panel comprising the first surface and the second diffuser panel comprising the second surface;

a first light source that emits the light of the ultraviolet region into the first diffuser panel;

a second light source that emits the light of the green region into the first diffuser panel; and a third light source that emits the light of the green region into the second diffuser panel.

20. An attraction device, comprising an attractor comprising two surfaces that comprise:

a first surface exhibiting a color of light comprising a larger amount of light in an ultraviolet region than an amount of light in regions other than the ultraviolet region; and a second surface exhibiting a color of light comprising light in a green region, the second surface being adjacent to the first surface, wherein:

a unidirectional edge of a contrast by the color of the light comprising the light in the ultraviolet region and the color of the light comprising the light in the green region is formed between the first and second surface, only the second surface exhibits, in the vicinity of the first surface, a color of light equivalent to the color of light exhibited by the second surface, only the first surface exhibits, in the vicinity of the second surface, a color of light equivalent to the color of light exhibited by the first surface, and the attractor comprises:

first and second diffuser panels that diffuse incoming light, the first diffuser comprising the first surface and the second diffuser comprising the second surface;

a first light source that emits the light of the ultraviolet region into the first diffuser panel;

a second light source that emits the light of the green region into the second diffuser panel; and a third light source that emits light of a third wavelength region different from the ultraviolet into the first diffuser panel.

21. An attraction device, comprising: an attractor that comprises: a first surface exhibiting a first polarized light; and a second surface exhibiting a second polarized light whose polarization direction is different from that of the first polarized light, and an edge of a contrast by the first polarized light and the second polarized light is formed between the first and second surfaces.

22. The attraction device according to claim 21, wherein the attractor comprises:

a first polarizing plate that is configured to comprise the first surface and pass light oscillating in a first direction; and a second polarizing plate that is configured to comprise the second surface and pass light oscillating in a second direction different from the first direction and is arranged adjacent to the first polarizing plate.

23. The attraction device according to claim 22, comprising a light source that irradiates the first and second polarizing plates with light.

24. An insecticidal or insect-capturing apparatus, comprising:

an attraction device according to claim 1; and an insect-capturer that is arranged on or around the attraction device and captures an insect attracted by the attraction device.

25. The insect-capturing apparatus according to claim 24, wherein:

the insect-capturer is arranged on the attraction device to be used as an insect-capturing surface, and the edge is arranged to pass through the center of the insect-capturing surface.

26. An insecticidal or insect-capturing method, comprising the steps of:

attracting an insect using the attraction device according to claim 1; and capturing the thus attracted insect using an insect-capturer that is arranged on or around the attraction device.

27. An insect-capturing apparatus, comprising:

an attraction device according to claim 21; and an insect-capturer that is arranged on or around the attraction device and captures an insect attracted by the attraction device.

28. An insect-capturing method, comprising the steps of:

attracting an insect using the attraction device according to claim 21; and capturing the thus attracted insect using an insect-capturer that is arranged on or around the attraction device.

* * * * *